Figure 12:
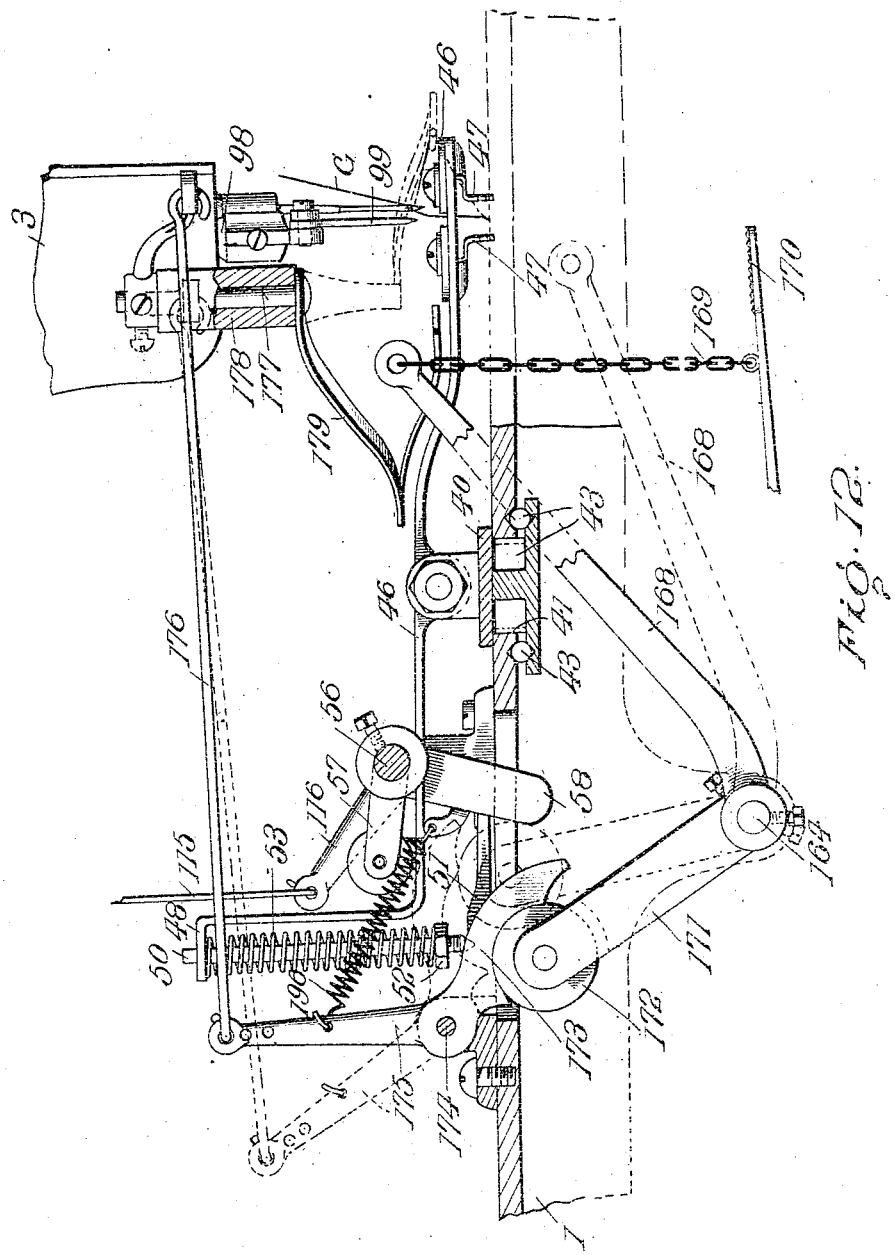

H. C. MILLER.
BUTTONHOLE SEWING MACHINE.
APPLICATION FILED SEPT. 8, 1905.

1,033,721.

Patented July 23, 1912.
14 SHEETS—SHEET 1.

Fig. 1.

Witnesses
W. A. Williams
A. H. Bennett

Inventor
H. C. Miller
By Jn. Imrie
Attorney

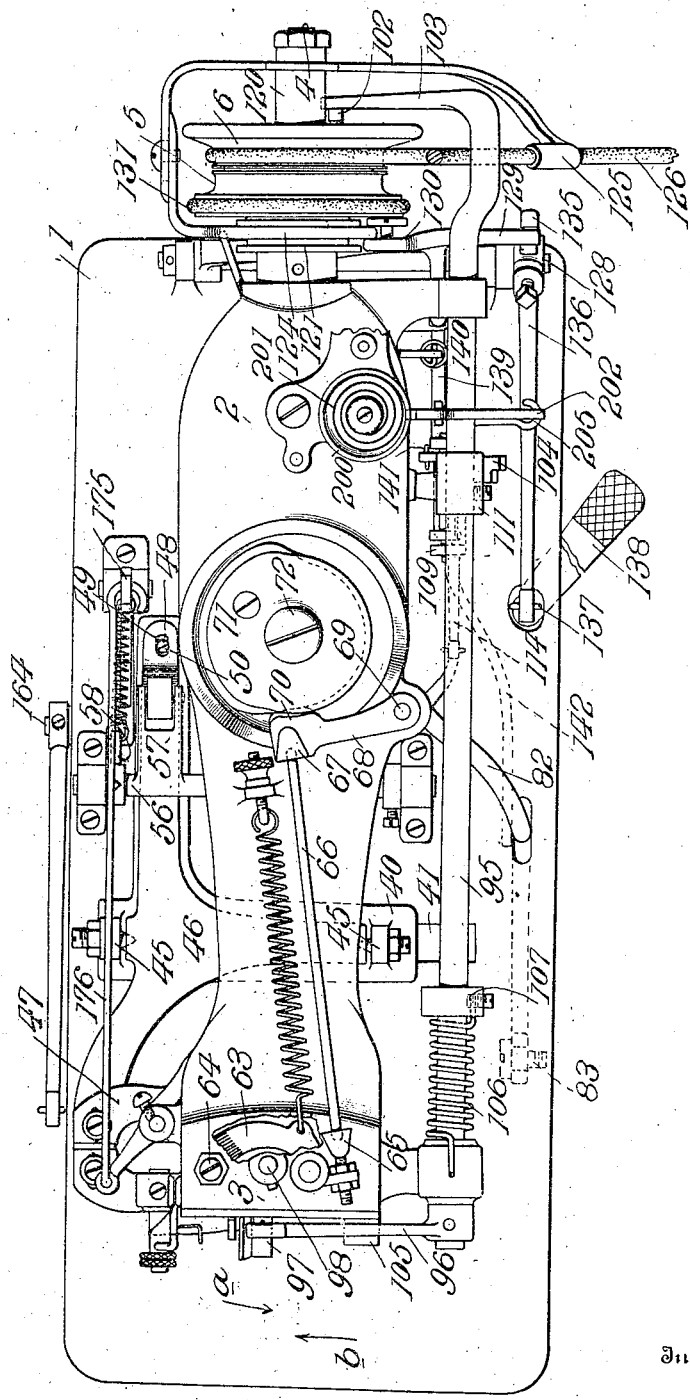

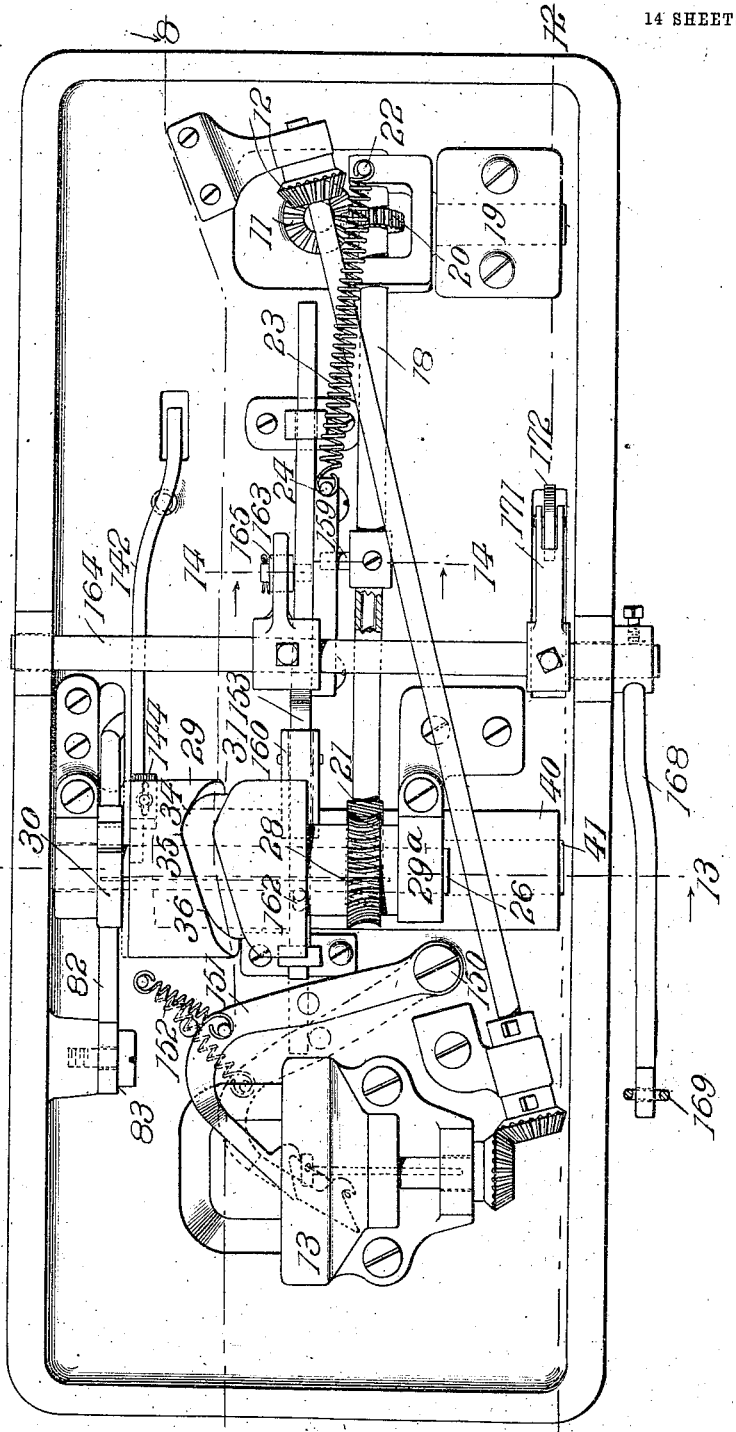

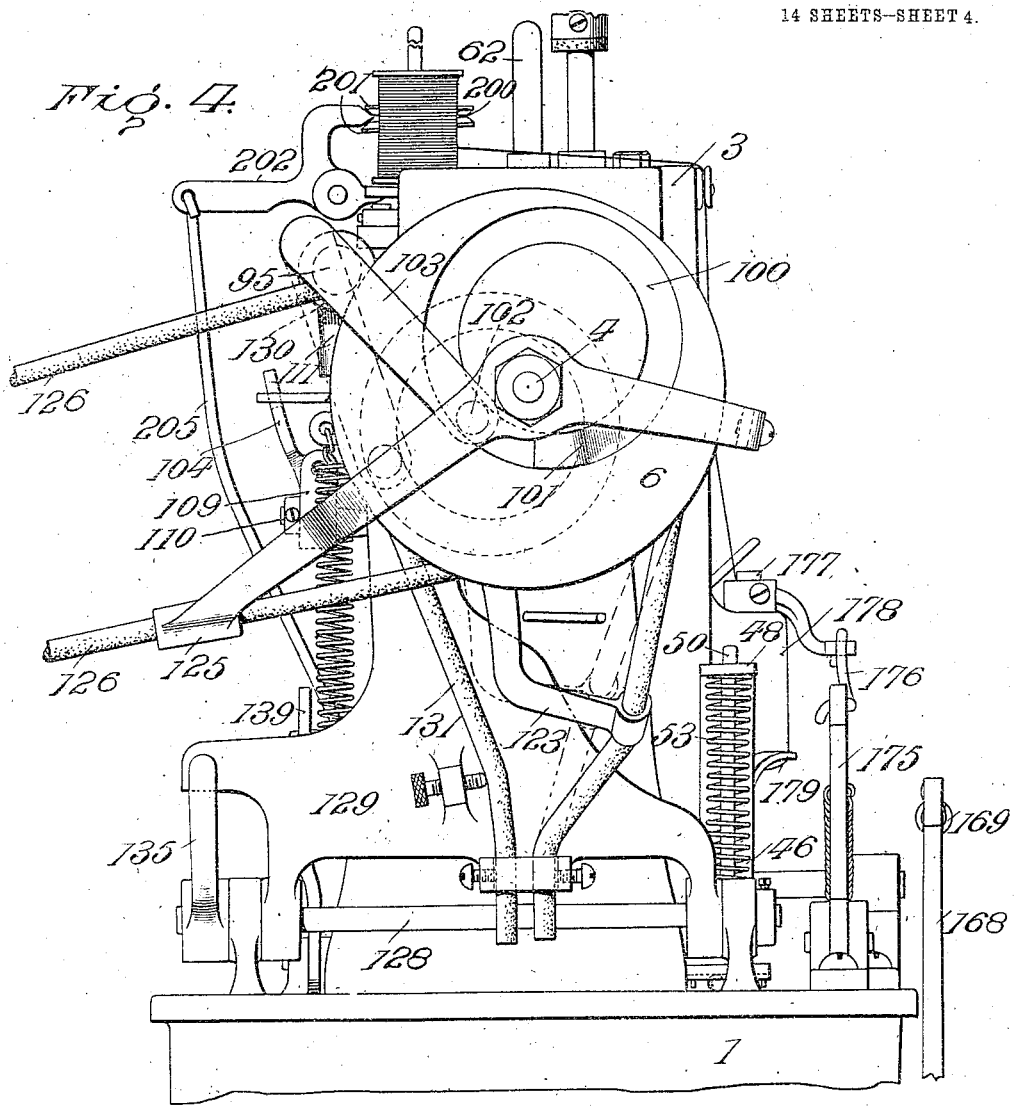
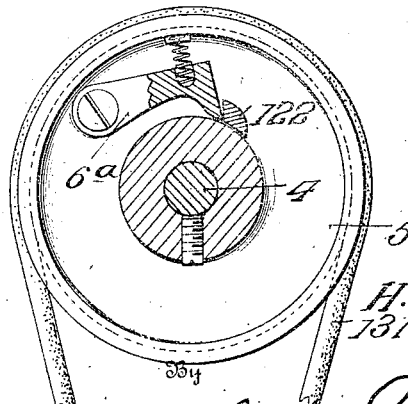

H. C. MILLER.
BUTTONHOLE SEWING MACHINE.
APPLICATION FILED SEPT. 8, 1905.
1,033,721.
Patented July 23, 1912.
14 SHEETS—SHEET 5.
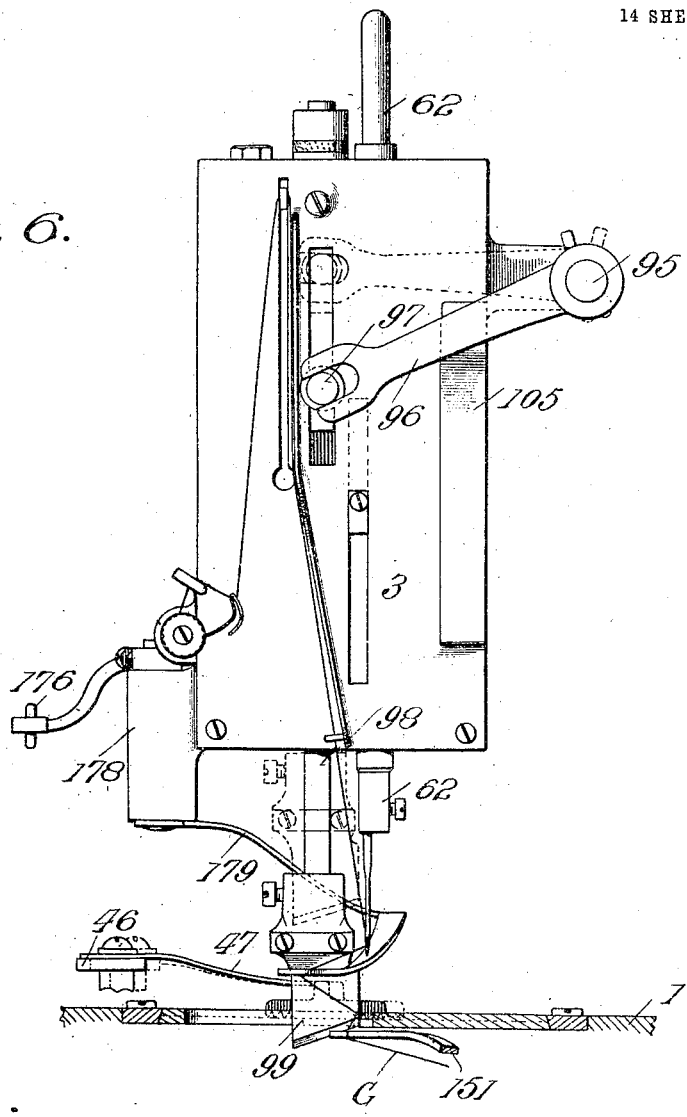
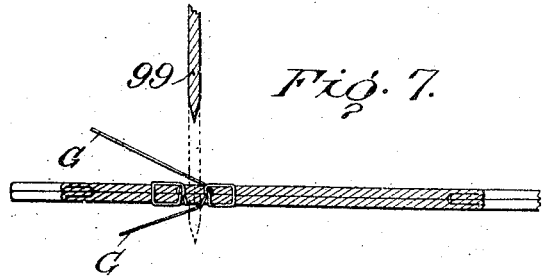
Witnesses
W. A. Williams
A. H. Bennett
Inventor
H. C. Miller
By
[signature]
Attorney

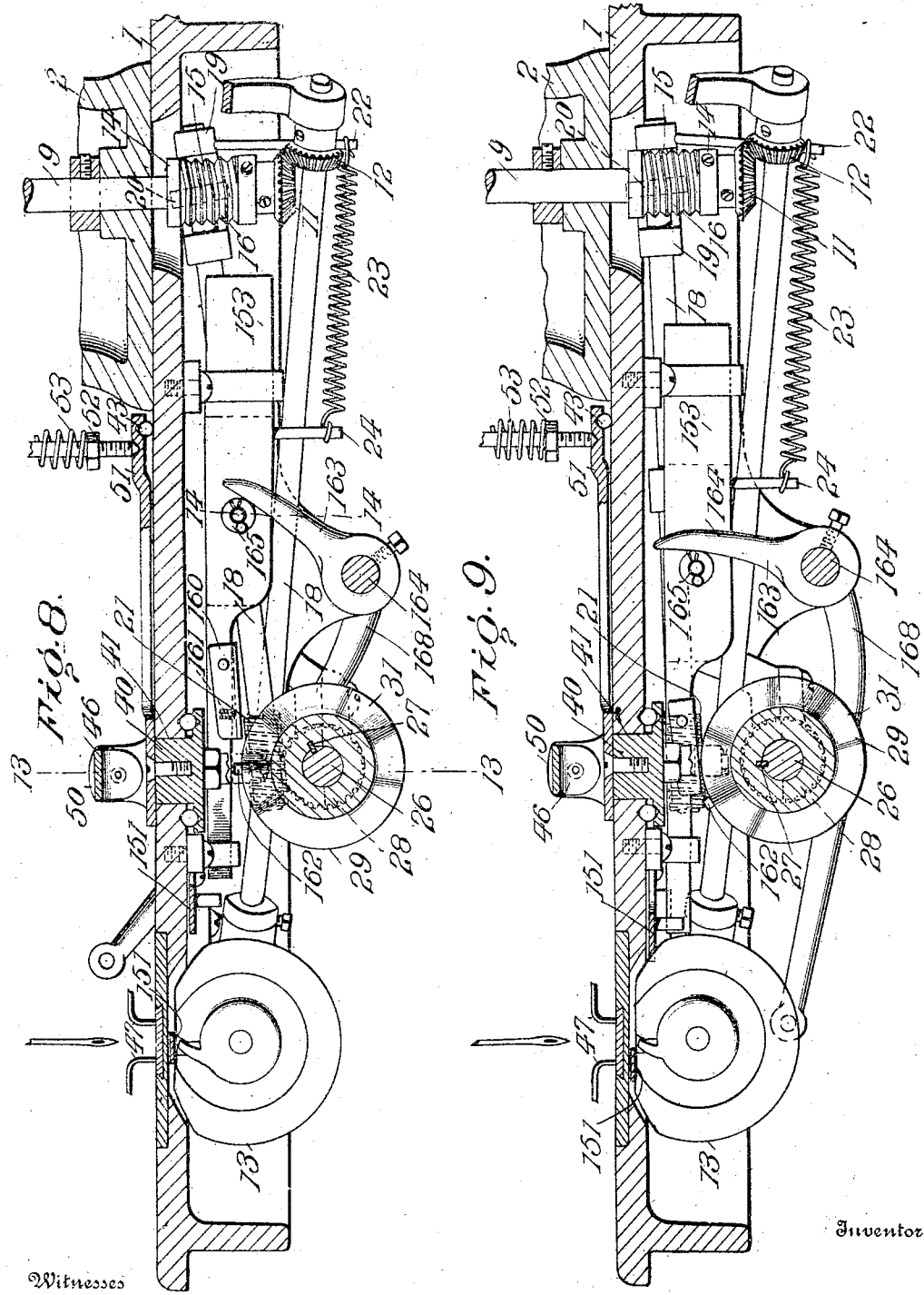

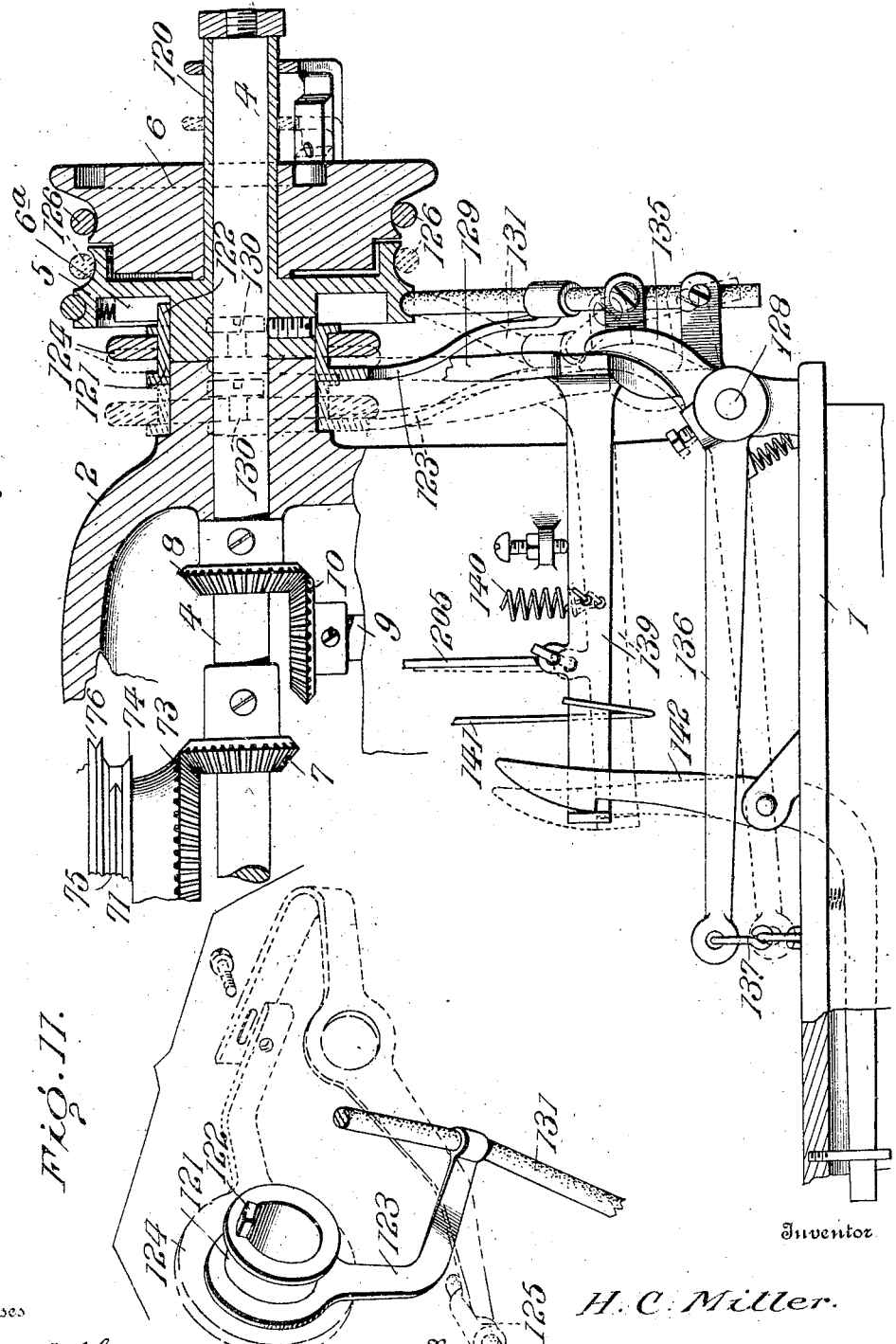

H. C. MILLER.
BUTTONHOLE SEWING MACHINE.
APPLICATION FILED SEPT. 8, 1905.

1,033,721.

Patented July 23, 1912.
14 SHEETS—SHEET 6.

Witnesses
W. A. Williams
A. H. Bennett

Inventor
H. C. Miller
By Jno. Moore
Attorney

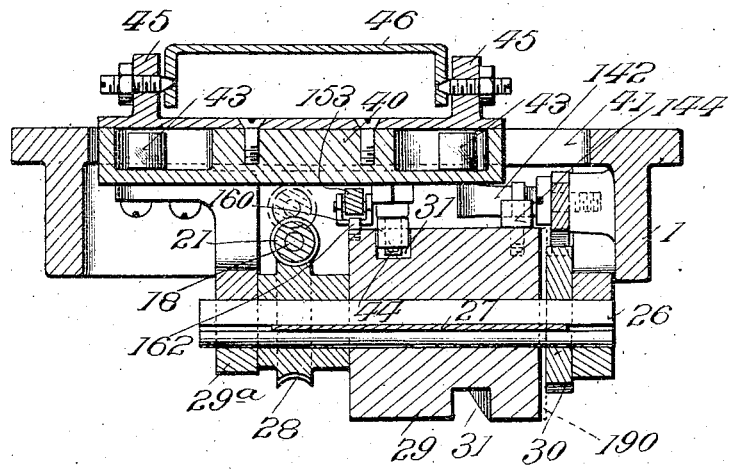
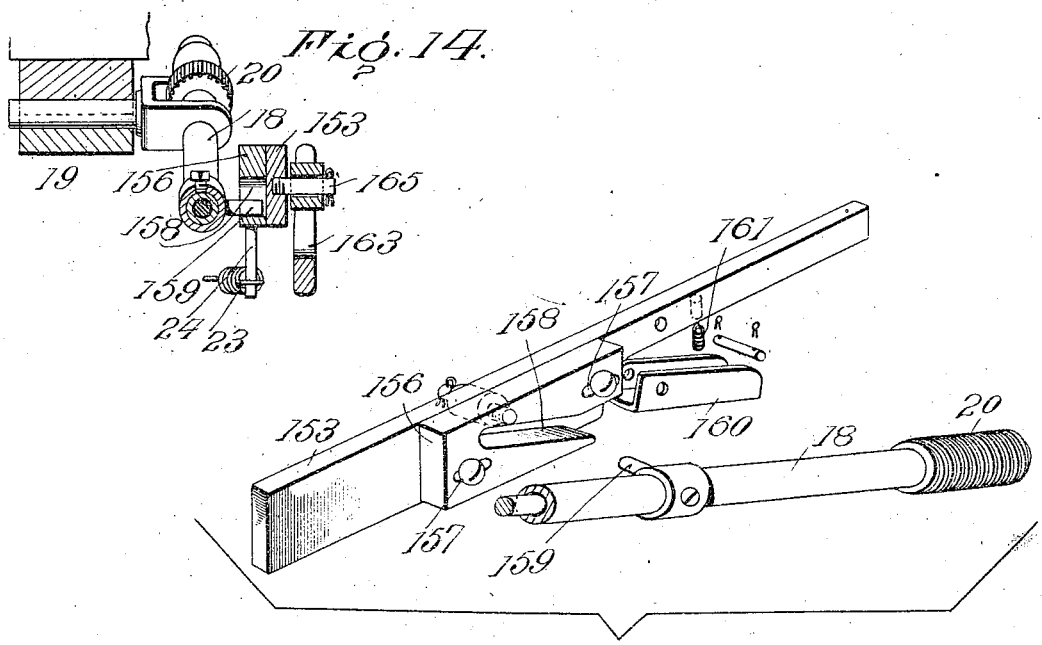

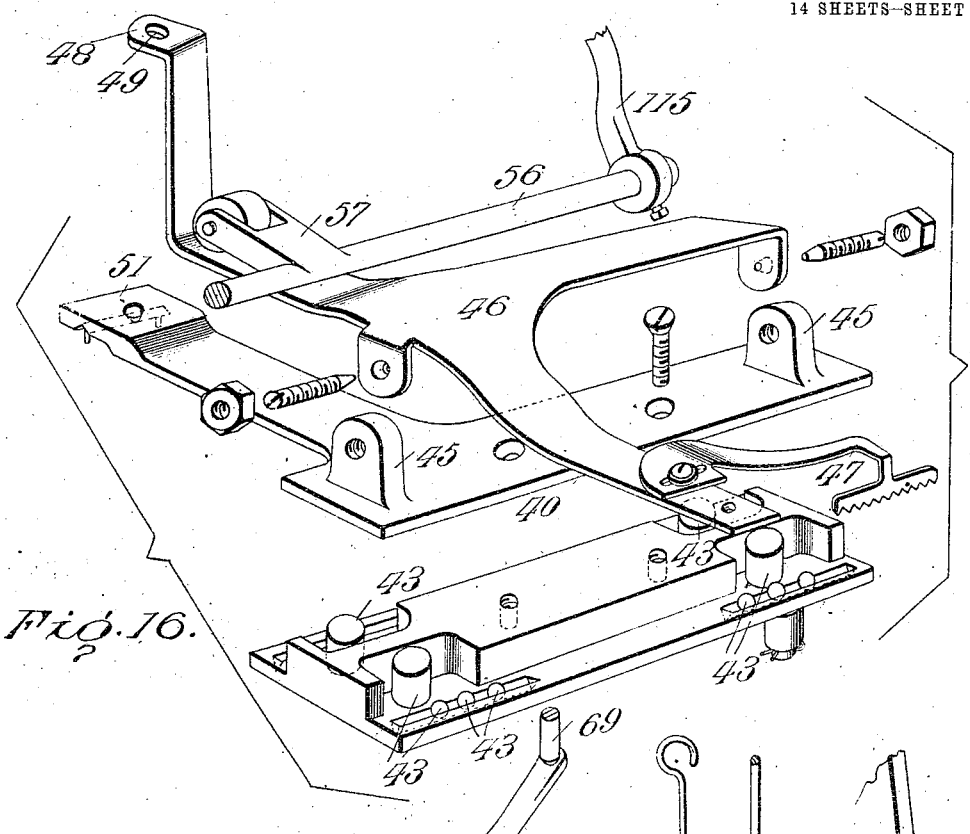
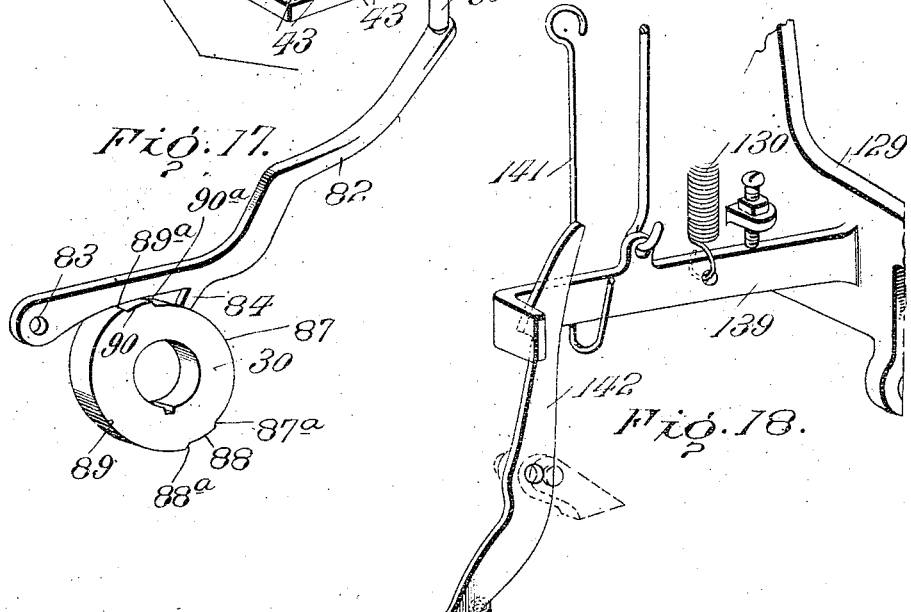

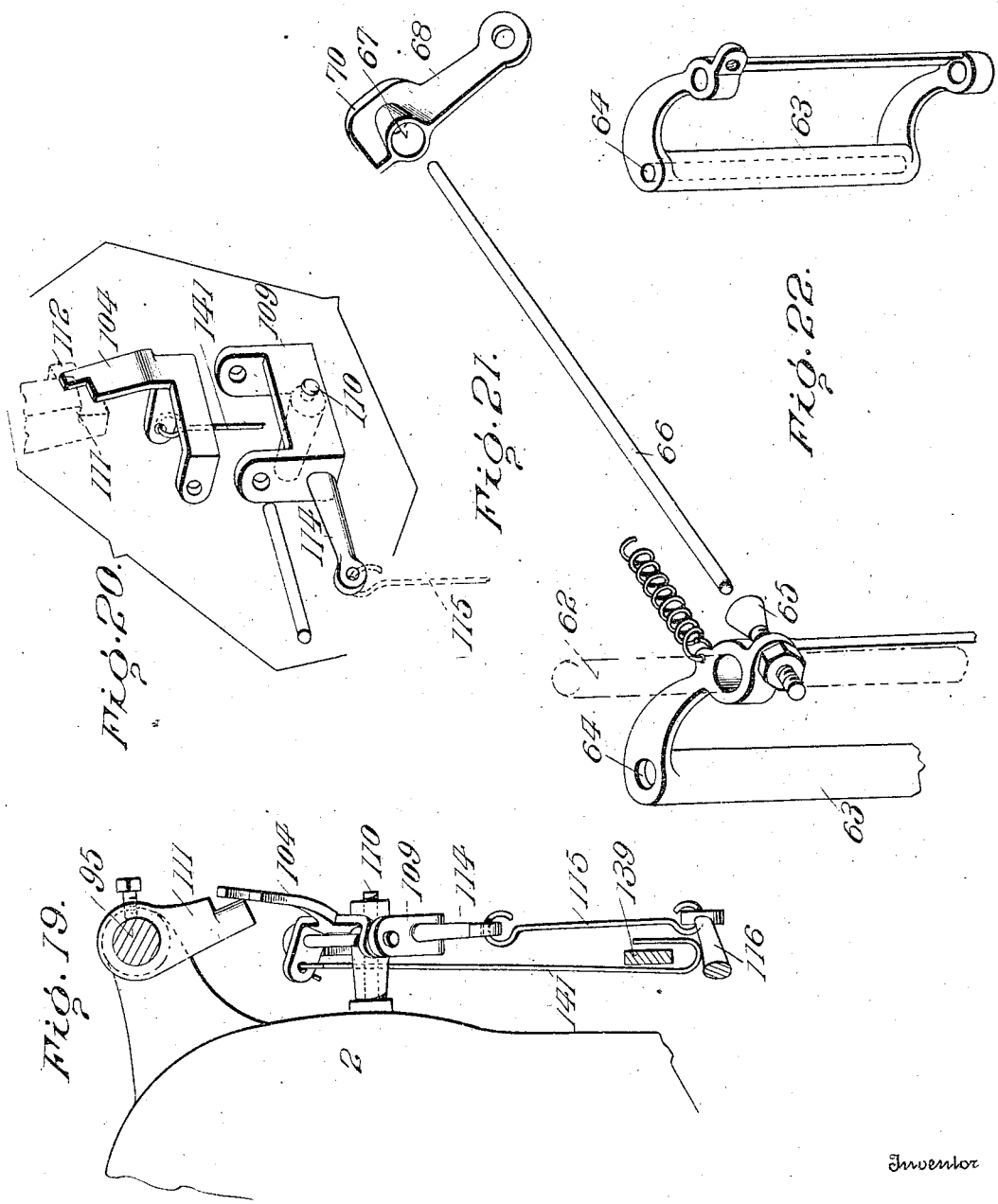

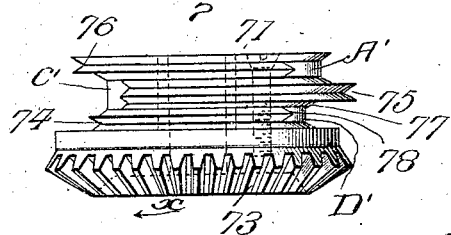
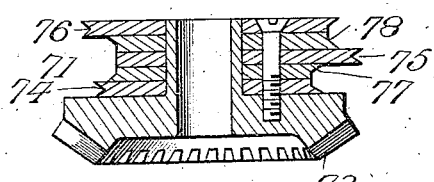
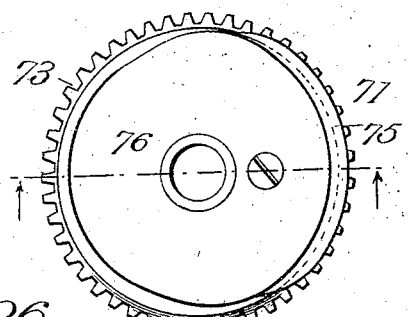
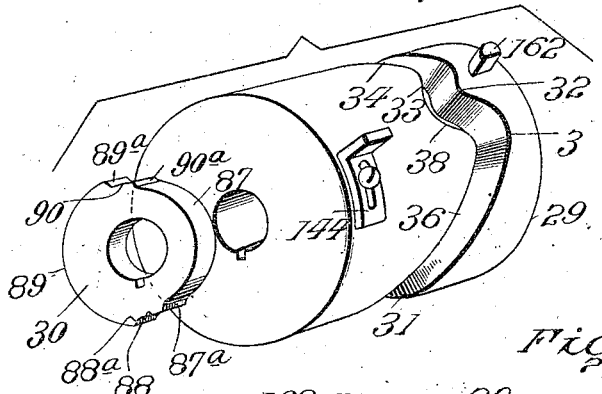
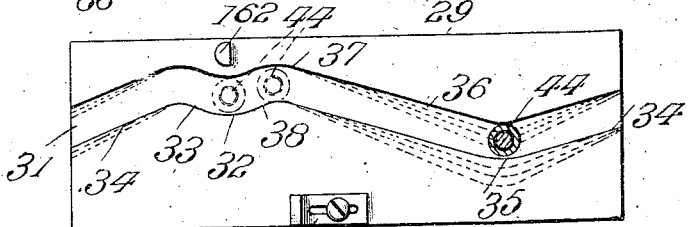

H. C. MILLER.
BUTTONHOLE SEWING MACHINE.
APPLICATION FILED SEPT. 8, 1905.

1,033,721.

Patented July 23, 1912.

14 SHEETS—SHEET 13.

Witnesses
W. A. Williams
A. H. Bennett

Inventor
H. C. Miller.
By,
Attorney

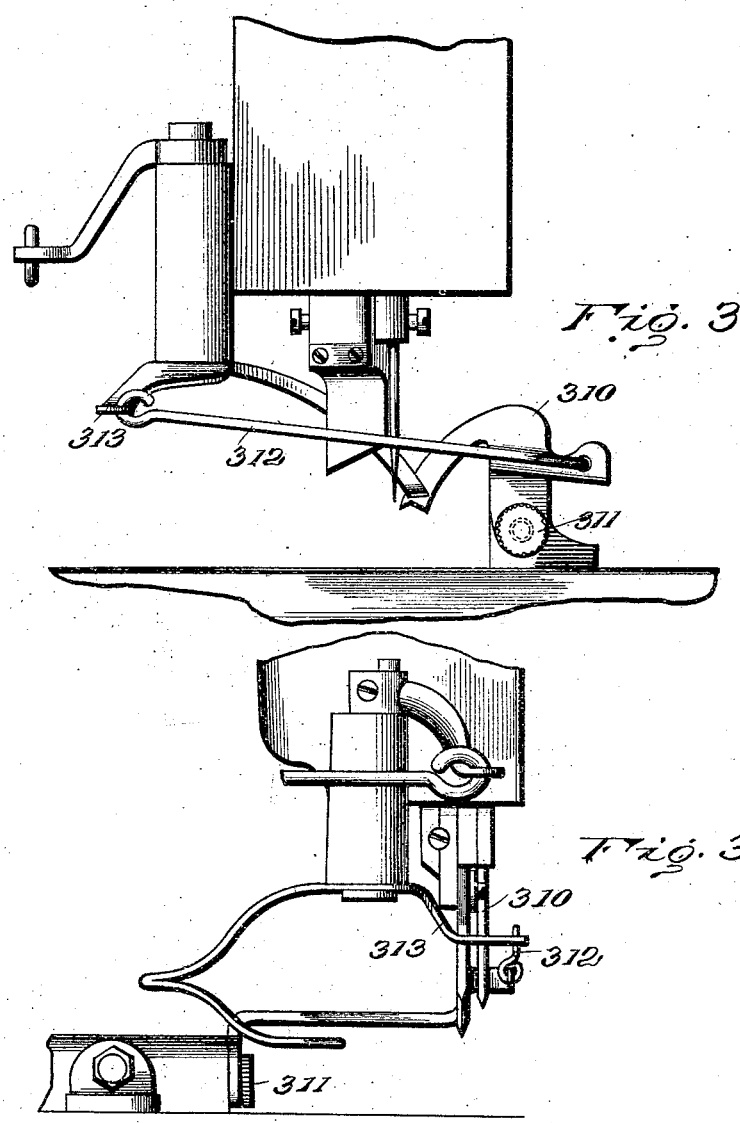

UNITED STATES PATENT OFFICE.

HENRY C. MILLER, OF WATERFORD, NEW YORK.

BUTTONHOLE-SEWING MACHINE.

1,033,721.  Specification of Letters Patent.  Patented July 23, 1912.

Application filed September 8, 1905. Serial No. 277,610.

*To all whom it may concern:*

Be it known that I, HENRY C. MILLER, a citizen of the United States, residing at Waterford, in the county of Saratoga and State of New York, have invented new and useful Improvements in Buttonhole-Sewing Machines, of which the following is a specification.

This invention relates to improvements in buttonhole machines.

Manufacturers have for a long time sought to obtain a machine which would produce standard length, and positive width, side and end buttonhole stitches. The importance of a structure having this characteristic may be more thoroughly appreciated by those using a large number of buttonhole machines of usual type. These machines produce uneven stitching owing to the employment of a single cam for forming buttonholes of various lengths; levers, etc., being used to alter the movement. This mechanism is not positive in action, and when one not thoroughly competent to handle a machine undertakes to make the necessary changes, low grade work, and a careless finish is the result. Frequently these machines when so set, form the end stitches too close together, resulting in the cutting of the end stitches when the slit is made. But this is not always the case, as a greater detriment exists, in that when the stitches are too close together the cutting blade while severing some of them, frequently skips others. When an article having a buttonhole such as described reaches the public it tends to put the grade of goods in ill repute. I have sought to cure these defects by arranging a set of cams for vibrating the needle and feeding the fabric, for each size buttonhole, and coöperating mechanism to work with a selected set of cams. The cams positively engage coöperating parts so that when one set is changed for another, the time of operation is sure to be exact.

My invention contemplates specific improvements in the cams employed to vibrate the needle.

In a pending application filed by me July 7, 1905, No. 268,752, I have broadly claimed a nest of cams for vibrating the needle, but I have found it desirable to provide means for positively holding the cams in contact with its operating member, during the time the operative faces of the cams are performing their mission. This is essential so as to prevent the fabric dragging, or the bending and frequently the breaking of the needle. This feature consists in forming a groove in the operative surface of each cam which merges into a track terminated in a smooth surface where it may be drawn to the next cam. In these grooves fit the edge of a cam lever, making it practically impossible for the lever to become disengaged from a cam before its mission has been entirely performed.

A further object of my invention is to provide manual means for returning the feeding clamps to their normal position to properly position the stitches relative to the cutting blade, after the stitching mechanism is at rest. I find this essential inasmuch as I form a lap stitch at the side of the buttonhole, and must necessarily return the fabric to initial position for the cutting blade to sever the thread and form the slit.

This invention also comprises special mechanism for manually throwing the cutting blade into communication with the power, to sever the previously located thread, and form the slit in the fabric. This mechanism permits of the cutting blade being operated to form the slit previous to the stitching operation, and then again after the stitches are completed to sever the threads.

Another object of the invention is the provision of specific means for feeding the fabric, and the detail mechanism coöperating therewith.

Other objects and advantages will be hereinafter referred to and be particularly pointed out in the claims.

Figure 28:
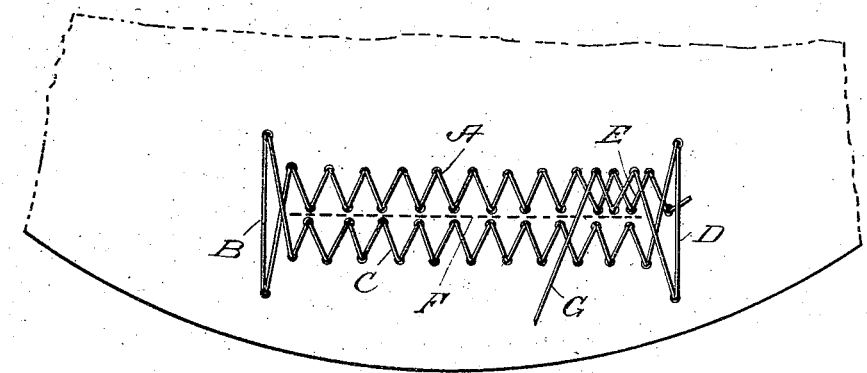
Figures 29, 30, 31:
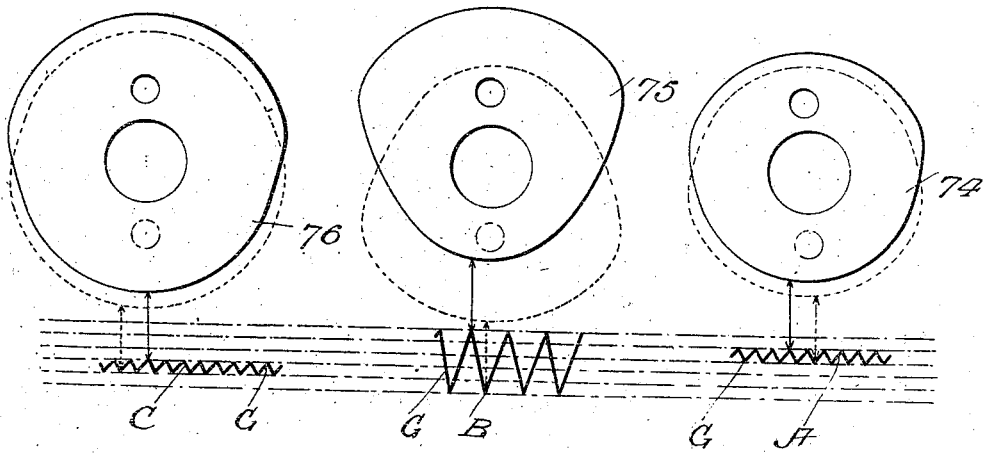

In the drawings: Figure 1 is a side elevation of my improved machine. Fig. 2 is a top plan view. Fig. 3 is a bottom plan view. Fig. 4 is an end elevation. Fig. 5 is a detail face view of the fast pulley. Fig. 6 is an end elevation looking from the head of the machine. Fig. 7 is a detail vertical section, illustrating the position of the upper and lower threads, previous to the descent of the cutting blade, the latter being shown in normal position in full lines, and down in dotted lines. Fig. 8 is a vertical section on the line 8—8 Fig. 3. Fig. 9 is a similar view, taken on the same line, but showing the parts in different position. Fig. 10 is a partial section and side elevation of the right hand end of the machine. Fig. 11 is a detail view of a part of the stop motion. Fig. 12 is a partial vertical section taken approximately on the line 12—12 Fig. 8. Fig. 13 is a transverse section on the line 13—13 Fig. 8. Fig. 14 is a similar view taken on the line 14—14 Fig. 8. Fig. 15 is a detail perspective view of a part of the operating mechanism located under the machine. Fig. 16 is a detail perspective view of the feeding mechanism, parts being separated. Fig. 17 is a detail perspective view of the time cam, and its lever. Fig. 18 is a detail perspective view of a portion of the stop motion and its operating lever. Fig. 19 is a detail face view of a latch for controlling the cutting blade. Fig. 20 is a detail perspective view of said parts separated. Figs. 21 and 22 are detail perspective views of the connection employed between the needle bar and the nest of cams. Fig. 23 is a detail view of the nest of cams. Fig. 24 is a section of the same. Fig. 25 is a plan view of the same. Fig. 26 is a detail view of a drum cam for operating the feeding device. Fig. 27 is a diagram of the cam groove in the drum cam. Fig. 28 is a diagram of a buttonhole formed by my improved machine. Fig. 29 is a diagram of the cam which forms the side stitches. Fig. 30 is a similar view of the cam which forms the end bars. Fig. 31 is a similar view of the cam which forms the opposite side stitches. Fig. 32 is an end view of a different form of my invention. Fig. 33 is a detail side elevation of the same. Fig. 34 is a detail perspective view of the auxiliary cutting blade, employed in the construction disclosed in Figs. 32 and 33.

The same numerals refer to like parts in all the figures.

1, indicates a bed plate of a buttonhole machine, on which the various mechanisms are mounted; 2, the arm; and 3, the head. A shaft 4, is mounted in the arm, and it carries fast and loose pulleys 5 and 6, and bevel gears 7 and 8. The end of the shaft 4, coöperates with the needle bar to impart the necessary reciprocating movement thereto, as will be readily understood.

A vertical shaft 9, is mounted in the upright portion of the arm 2, and has at its upper end a beveled pinion 10, meshing with the beveled pinion 8, and at its lower end said shaft carries a pinion 11, meshing with a pinion 12, for imparting the necessary motion to the lower stitch forming mechanism 13. On the shaft 9, near the lower end is a worm 14, whose threads are partially spiral as at 15, and partially concentric as at 16. This worm is the means I employ for imparting the necessary intermittent movement to the feeding mechanism, and the coacting mechanism which vibrates the needle; the worm being constantly revolved during the stitching operation.

A shaft 18 under the bed 1, is mounted in a pivotal bearing 19, and it bears a worm gear 20 which meshes with the worm 14, while at the opposite end the said shaft is provided with a worm 21. A pin 22, depends from the pivoted bearing beyond the worm gear, and to it is secured a spring 23, whose opposite end is fastened to a projection 24 depending from a sliding bar 153. The tension of the spring tends to draw the pin 22 and the end of the shaft down, and elevate the opposite end to disengage the worm 21, from its gear, for a purpose to be described.

Mounted in bearings depending from the bed 1, is a shaft 26, having a spline 27, and it carries a worm gear 28, which meshes with the worm 21; and a drum cam 29, adapted to have a slight lateral movement, between the worm gear 28, and a time cam 30, fixed to the shaft. The cam 29, is formed with a groove 31, which starts at a point 32, then inclines therefrom as at 33, from where it inclines at 34, to a point 35, from where it inclines in an opposite direction, as at 36, to a point 37, where a short reversed or proud portion 38 joins the point 32. Each portion of the cam groove operates the feeding mechanism to move the fabric during the stitching of a buttonhole, the slight lateral movement of the cam above referred to coöperates with the groove to accomplish the desired result. When the cam 29, is in its normal position, as shown in Fig. 13, and the machine is started, the intermittent movement from the worm 14, is not imparted to the feeder, until the end of the cam abuts against the time cam 30. During this pause in the movement of the feeder one of the end bars of the buttonhole is formed, as will be fully described.

A slide 40, reciprocates in a groove 41 in the bed plate, and it consists of an upper and under plate which lap the edges of the groove to form guides; anti-friction rollers and balls 43, bearing against the walls of the opening, serves to reduce the friction. A projection 44 depends from the slide, and it is provided with a roller which fits in the cam groove 31, by which means movement is imparted to the slide as the cam is revolved. In ears 45 on the slide is pivotally mounted a tilting arm 46, carrying at its outer end a pair of yielding combined clamps and feeders 47. Each feeder is adjustably secured to the arm by set screws, and may be independently regulated. The opposite end of the tilting arm is bent upwardly and over, as at 48, and is formed with an opening 49, to receive the end of a pin 50. The lower end of the pin is seated in a cavity formed in an extension 51, of the slide 40, and is threaded to receive a nut 52, between which and the bent end 48, bears a coiled spring 53.

A shaft 56, is mounted over the tilting arm 46, and it has fixed to it a projection 57, bearing a roller, adapted to bear on the arm 46, and rock it on its pivots to elevate the clamp feeders 47, for the release of the fabric, or the insertion of another piece. An arm 58, is fastened to the shaft 56, and is in the path of a lever arm 171, operated by a manually controlled lever 168.

The needle bar 62, reciprocates in a vibrating frame 63, pivoted in the head 3, at 64. The frame is provided with an adjustable screw formed with a cup shaped depression 65, and in the latter fits one end of a link 66, the other end of which engages a similar depression 67, formed in a cam arm 68, and fast on a vertical rod 69, a spring 66ª, serving to hold the link in the cups. Cam arm 68 is formed with a beveled head 70, to engage with one of a nest of cams 71, mounted on a stub shaft 72, and formed with a beveled gear 73, meshing with the beveled gear 7.

The nest of cams as shown, consist of five individual cams 74—75—76—77 and 78, the three former being working cams, and the latter two switching cams. The operative peripheries of the cams are formed with V-shaped grooves, and the beveled head 70, of cam arm 68, operating in said grooves is beveled accordingly to absolutely prevent disengagement except at the proper point. This holding the cam arm in contact with the nest of cams insures of the needle being up and out of the fabric when the working cam is opposite the cam head 70, otherwise the cam head might shift from one cam to the other at an inopportune time, and bend or break the needle, or cause the fabric to drag and produce imperfect stitching. It will be noticed that only the operative surfaces of the cams are grooved, the latter merging into smooth surfaces, so that the head 70, may be transferred from one cam to the other without fear of encountering the other, a point I regard as of vital importance toward the successful operation of my machine. During the time the head is being shifted the needle is in the fabric.

Rod 69, operates in bearings, and is provided with a collar 80, against which and the upper bearing is a coiled spring 81, to normally retain said rod in its lowest position. The lower end of rod 69, rests on the free end of lever 82, pivoted at 83 to the bed 1, and having a projection 84. Projection 84, coöperates with the time cam 30, the latter having peripherical surfaces 87—88—89 and 90, each coöperating with the working cams.

On one side of arm 2, is mounted a shaft 95, provided at one end with a bifurcated arm 96, engaging a pin 97, projecting from bar 98, carrying at its lower end a cutting blade 99. Shaft 95, is adapted to be rocked by a cam groove 100, formed in the face of the loose pulley 6, in which is located an ejecting cam 101, the latter causing the disengagement of a projection 102, on an arm 103, fast on said shaft 95. The shaft is not only rocked but is moved laterally toward and from the head 3 by a latch 104, and when so moved, arm 96, travels on a cam surface 105, to insure the projection 102, remaining in the cam groove 100, after the latch 104, has been disengaged.

A coiled spring 106, encircles the shaft 95, being located between one of the bearings and an adjustable collar 107; said spring serving to retain the shaft in its normal position, and also to disengage projection 102, from its groove. The cam 101, is what may be termed a safety device to insure the disengagement of the projection 102, from its coöperating cam groove. The spring will accomplish this function under ordinary circumstances, but with a high speed machine, the rapidly revolving pulley 6, is apt to carry the projection past its disengaging point, hence I have found it expedient to use the cam 101.

The latch 104, is pivotally mounted in a rocking frame 109, mounted on a stud 110, on the arm 2. Said latch, coöperates with a projection 111, on shaft 95, to throw the cutter into operation, and offset from the projection is a lug 112, which is in the path of the latch to disengage the latter from the projection when shaft 95 is rocked, so that the cutter will make but one stroke. A lever 114 attached to the rocking frame, is connected by a link 115, to an arm 116, on the shaft 56, so that upon movement of the shaft after the stitching operation is over, the latch is moved to throw the cutter into operation.

The stopping and starting mechanism is substantially the same as that described in my pending application No. 262,401 filed May 26, 1905, but in order that the operation of the present invention may be understood I will briefly describe it. The fast pulley 5, is formed with a sleeve 120, on which the loose pulley 6, is mounted, and on the hub of said fast pulley, and a hub of the arm 2, operates a grooved collar 121, provided with a lug 122, and a depending arm 123, having an eye at its outer end. A ring 124, works loosely on the periphery of the collar 121, and an arm extends from the ring, and is connected with a second arm formed with an opening to engage the sleeve 120, and an eye 125, through which the power belt 126 passes. A pivotally mounted spring actuated pawl 6ª is mounted on the inner face of the fast pulley, and is normally in the path of the lug 122. On a shaft 128 mounted on the bed, is a plate 129, which has a flanged end 130, to engage the edge of the ring 124, to move it in the operation of stopping and starting the machine. A yielding belt 131, passes around the grooved periphery of the fast pulley, and the ends of the belt are secured by set screws to a lug on the plate 129. The belt also passes through the eye on the end of the depending arm 123, so that when the latter is rocked by the pawl 6ª contacting with the lug 122, the belt will become tightened. An arm 135 is fast on the shaft 128, and engages a lug on the plate 129, and with the arm is a lever 136, having a chain 137, at its outer end, which is connected with an operating treadle 138. A lever 139, extends from the plate 129, and connected to it is a spring 140, which acts to draw the lever up and throw the parts to stop the machine. A link 141, connected to the rocking latch 104, has a loop at its lower end through which the lever 139, passes. When the machine is at rest, the link is drawn up by reason of the latch having been thrown outwardly by the lug 112, hence when the lever 139, is depressed to start the machine it encounters the loop and tilts the latch to set it in operative position for the cutting operation. A latch 142, is pivoted to the bed at 143, and has formed with it a projection to catch over and hold the lever 139 in operative position, while the opposite end of said lever is positioned in the path of a lug 144, on the drum cam 29. At the proper time this lug strikes the lever 142, and disengages the lever 139, to automatically stop the machine.

In my pending application for Patent, No. 251,307, filed March 21, 1905, I described generically means for automatically severing the thread when the buttonhole was cut. The thread in this instance is cut by the cutting blade, the same as in the previous application, but the means employed for placing the thread has been materially changed. Pivoted at 150, to the underside of the bed is a curved arm 151, whose free end is formed with a notch to engage the thread of the lower stitch forming mechanism, and a spring 152, is employed to hold the arm in its normal position. A sliding bar 153, is mounted in bearings on the underside of the bed, one end of said rod being positioned opposite a pin on the curved arm 151, as shown in Fig. 3, to engage the same and turn the arm on its pivot to place the lower thread across the path of the cutting blade 99. The sliding bar has attached to it block 156, adjustable by means of screws and slots 157. The block has formed in it an inclined slot 158, in which fits a pin 159 on a sleeve in which is mounted the shaft 18, so that as the bar is moved the pin is caused to follow the slot and rock the shaft 18 to disengage the worm 21, from its gear 28. Just after this movement takes place, a finger 160, pivoted to the bar, and normally depressed therefrom by a light spring 161, engages a lug 162, on the drum cam, and slightly turns it, sufficiently to cause the projection 31 to pass the inclined portion 33, of the groove 31, to properly start the next buttonhole stitch.

Sliding bar 153, is moved to cause the above mentioned operation by an arm 163, on an operating shaft 164, striking a projection 165, while the spring 23 serves to restore said bar to its normal position. When the bar is advanced, the tension of spring 23, is increased, and as previously described, one end of it is fastened to a projection on the rocking bearing, and assists the pin 159, and cam slot 158, in holding the worm 21, separated from its gear 28.

The shaft 164, has secured to it a lever 168, connected to a chain 169, attached to a pedal 170, also secured to shaft 164, is a lever arm 171, bearing a roller 172, which contacts with a cam arm 173, pivoted at 174, and provided with a lever 175, and the crank arm of a short shaft 177, mounted in bearings 178, on the head 3. Attached to the lower end of shaft 177, is a curved arm 179, the free end of which is positioned so as to throw the thread of the upper stitch forming mechanism across the path of the cutting blade 99. When shaft 164, is rocked the lever arm 171 contacts with the cam arm 173 and rocks it, and through the link connection, the curved arm 179, is moved to accomplish its mission. The devices for placing the upper and lower threads across the path of the cutting blade being operated by the same shaft, both threads are simultaneously moved so that the cutting blade severs both of them in one operation. When the shaft 164 is rocked, the roller 172, first contacts with the cam arm 173, and then strikes the arm 58, and depresses the tilting arm 46, to raise the feeders 47, however, it will be noted that this operation does not take place until the other movements described have been accomplished.

200, indicates a tension device mounted on the arm 2, and comprising a pair of spring actuated beveled disks 201, between which the thread passes. A bell crank lever 202, is pivoted opposite the disks, the point of said lever being beveled and fitting between the disks, while to the free end of said lever is connected a rod 205, secured at its opposite end to the lever 139. When the sewing mechanism is started the bell crank lever 202, is rocked on its pivot, and its beveled end is disengaged from between the disks, and so that when the thread is drawn out it is under tension, but when the stitching operation is over, and lever 139, is thrown up to its normal position the disks are spread apart, and the thread is slackened, so that the arm 179, can draw the thread to position it in the path of the cutting blade, at the same time provide ample thread to start the next stitching operation.

The general operation is as follows: The operator depresses treadle 138, and through the arm 135, the plate 129, is rocked on its pivot. The outer end of lever 139, being caught by the catch lever 142, and held until automatically released, after the stitching operation is over. When plate 129 is rocked the head 130, moves the ring 124, and this in turn shifts the belt 126, from the loose to the fast pulley. As the ring 124, continues to move it contacts with the collar 121, and moves the latter, to remove the lug 122, from the path of the pawl 6ª. By the time the lug 122, is out of the way of the pawl, belt 126, is thrown onto the fast pulley, whereupon the power is applied to operate the stitching mechanism, and the feeding mechanism. The rapidly running fast pulley 5, throws pawl 6ª outwardly against the tension of its spring, where it remains during the stitching operation. Power having been applied, shaft 4, through its connections in head 3, reciprocates the needle, while the gear 7, and its connection operates the vibrating nest of cams 71, and the gears 8 and 10 operate the lower stitch forming mechanism 13, and the feeding devices 47. Shaft 9, is constantly revolved when the fast pulley is in motion, and by the connection between the worm 14, and worm gear 20, shaft 18, is intermittently revolved, hence the drum cam 29. When the machine starts, the projection 44, is at the point 37, and the cam is intermittently revolved, the portion 36, feeding the fabric in direction of arrow $a$, (Fig. 2) forming the side stitches A, (Fig. 27). When the point 35 of cam groove 31 is reached the feeders remain stationary, because of the lateral movement of the cam on its shaft. That is to say when the angle of the cam groove changes, and as the cam may move on its shaft, the friction between the parts moves said cam laterally against the bearing 29ª, which forms an abutment. At this time the barring stitches B, are formed, and immediately after their completion the lateral movement of the cam ceases, and the portion 34, of the cam groove reverses the intermittent movement of the feeders 47—47 in direction of arrow $b$, until point 33, is reached, during which time the opposite side stitches C, are formed, whereupon by reason of the lateral play of the drum cam on the shaft in the opposite direction, the feeders are again held stationary while the other barring stitches D, are formed. These stitches having been completed the cam portion 33, of the groove 31, again reverses the movement of the feeders in the direction of the arrow $a$, to form the short tying stitches E, after which the stitching mechanism is automatically stopped by the lug 144, contacting with the lever 142; the projection 44, remaining at the point 32, as shown in dotted lines in Fig. 27.

When making plain buttonhole stitches a washer 190 or the like is placed between the drum cam and one of the abutments to take up the lateral play, referred to. In this event the feeders do not pause as previously described, but on the contrary their movement is immediately reversed.

The time cam 30, is intermittently revolved simultaneously with the drum cam, and the peripherical surfaces 87—88—89 and 90, are arranged to act in conjunction with the movement of the feeders. During the time the feeders are moving to feed the fabric to receive the side stitches A, the cam surface 87, is acting on lever 82, to position the cam arm 68, so that the head 70, will register with the cam 74, of the nest 71. Cam 74 is of such shape as to vibrate the needle to produce the zig-zag stitches A. When these stitches have been formed the cam 87ª, raises the lever 82, and its projection rides on the cam surface 88, to position the head 70, adjacent the cam 77 to switch head 70 opposite cam 75, the latter vibrating the needle to produce the barring stitches B, (the feeders in the meantime remaining stationary). The end bar stitches B, having been formed, the cam 88ª lifts the lever 82, and the projection rides on the cam surface 88, and by the switch cam 78, the head 70, is positioned opposite cam 76 and as the movement of the feeders has been reversed, the opposite side stitches C, are formed, upon completion of which the feeders pause, and the cam 89ª drops projection 84 onto cam surface 90, to switch head 70, opposite cam 75, and the other barring stitches D, are formed. After the stitches D, are completed cam 90ª, drops projection 84, to cam surface 87, and switch cam 77, shifts head to cam 75, and the tying stitches E, are produced. The nest of cams is revolved sufficiently to form the latter stitches, and when they are completed, the adjustable lug 144 on the drum cam strikes the end of the lever 142, and disengages the lever 139, of the plate 129, and the spring 140, immediately applies the stop motion.

To better understand the operation of the cams and the manner in which the switching cams perform their function, it will be necessary to refer to Fig. 23. Assume the follower 70, to be operating in the working cam 76, and the cam nest is revolving in a direction of arrow X and it is time for the follower to position itself before working cam 75. Obviously the follower cannot become disengaged from the cam 76, because of the grooved periphery. Hence when the cam has revolved to bring the portion A', of the nest in line with the follower and if it is time for the latter to shift laterally (the automatic follower shifting device including cam 30, controlling the time of shifting) it will do so only at this point, whereupon said follower will travel in the switching cam 78, until the next smooth portion C' is reached, when the follower will again move laterally and in line with working cam 75, which after doing the work desired of it, said follower is again moved laterally by the smooth portion C', until it comes opposite switch cam 77. At this time the follower is brought to the smooth portion D', where it will move laterally to the working cam 74. It will of course be understood the follower is placed opposite the barring working cam 75, twice; once for forming end barring stitches at one end, and the second time, for forming the barring stitches at the other end of the buttonhole. The whole cycle of movement takes place automatically, while the machine is in operation.

When the plate 129, is returned to normal position by its spring, the power belt is first thrown from the fast to the loose pulley, and simultaneously the friction belt 131, is tightened on the fast pulley to reduce the speed of the latter. The movement of the plate also moves the collar 124, toward the fast pulley and positions the lug 122, in a plane with the pawl 6ª. The friction of the belt 131, gradually reduces the speed of the fast pulley until the spring of the pawl 6ª, overcomes the centrifugal force and advances the point of said pawl toward the center of the shaft, whereupon it encounters the stop 122, and rocks the depending arm 123, and the friction belt is further tightened on the fast pulley, (see Fig. 4) and quickly brings the power shaft to a stand-still. This stopping means while absolutely effective and sure, does not in the slightest cause a sudden jar, and by reason of the arrangement of parts with which said means coöperate the needle will be stopped above the fabric. The buttonhole stitches are now completed, and it only remains to cut the slit E, sever the threads G, and set the feed operating mechanism for the next operation. When the operator pulls down the lever 136, the lever 139 engages the loop of the link 141, and rocks the latch to position it in a plane with the lug 111, on shaft 95, as previously described, so that the cutting blade can be manually thrown into connection with the power mechanism.

It will be remembered that when the stitching operation was completed the projection 44 was at the point 32, and it must be manually moved to the point 37, to properly position the stitches relative to the cutting blade, and to locate the feeders to form the stitches for the next buttonhole, but before this can be accomplished the worm 21, and its gear 28, must be separated. The operator, therefore, draws down the lever 168, and rocks the shaft 164, causing arm 163, to contact with roller 165, which first rocks the shaft 18, on its pivotal bearing 19, by means of the pin 159 riding in the inclined slot 158, which disconnects the worm 121 and gear 28. In the movement of the bar 153, its end strikes the curved arm 151, and positions the lower thread in the path of the cutting blade. Simultaneously with this movement roller 172, rocks the lever 175, and through the connections the upper curved arm 179, is turned to position the upper thread in the path of the cutting blade. As the movement of the bar 153 is continued, and after the worm and gear are disengaged the finger 160, strikes the lug on the drum cam 29, and turns it sufficiently to position the projection 44, at the starting point of the cam groove 31, which moves the feeders to properly position the stitches relative to the cutting blade.

After the threads have been positioned the arm 116, on shaft 56, rocks the frame 109, on its pivot, and the latch 104, forces the shaft 95, against the spring 106, and the projection 102, on arm 103, is forced into the cam groove 100, in the face of the loose pulley 6. Immediately the cam groove 100, rocks shaft 95, arm 96, travels on the cam surface 105, insuring the engagement of the projection and cam groove, to complete the stroke of the cutting blade. When the shaft 95, is rocked, the lug 112, kicks the latch 104, out of the way, so that the knife can make but one stroke, notwithstanding the operator is still holding down the lever 168. When the loose pulley has made one complete revolution, the cutting blade is forced down and drawn up again, whereupon the spring 106, and the projection engaging the cam 101 returns the shaft 95 to its normal position. The parts are so timed that, immediately the cutting blade descends to sever the threads and cut the slit in the fabric by continued pressure on the lever 168, the roller 172, will contact with arm 58; and rock shaft 56, and elevate the clamp feeders, for the withdrawal of the fabric, and the insertion of another piece. Upon release of pressure on the treadle 170, the springs 23 and 196, return the parts to their normal position.

By the construction described I produce a buttonhole machine, which is extremely simple and durable, the parts being arranged so as to permit ready and convenient access to them, for repairs, etc., as will be fully appreciated by those skilled in the art.

It frequently occurs in factories using a large number of buttonhole machines, that a particular machine could be used to better advantage if it were possible to quickly change the parts to stitch a longer or shorter buttonhole. I have found that by arranging the cam 29, worm 21, and nest of cams 71, in sets, that the remainder of the parts described, will operate in conjunction therewith, and longer or shorter stitches can be produced. In other words I propose to employ a set of interchangeable cams for each size buttonhole, any one set coöperating with the other parts of the machine.

When the threads are placed in the path of the cutting blade, they are severed by it, thereby accomplishing two operations with a single element, i. e. forming the slit in the fabric, and severing the threads. I may, however, employ a separate cutter for severing the threads, the same passing through the fabric to sever the lower thread, and then operate the cutting blade to form the slit. Under these conditions it would be preferable, but not necessary, to form the slit, prior to the forming of the stitches. This modified form of the invention is illustrated in Figs. 32, 33, and 34. In this construction, 310, indicates an auxiliary blade pivoted at 311, and connected by a link, 312, with an extension, 313, of the curved arm, 179. When the latter is operated as previously described, the auxiliary blade is turned on its pivot and its cutting end is thrust through the fabric and severs the thread. Furthermore I desire it to be distinctly understood that this feature of my invention is applicable to one or more thread buttonhole machines.

In the general organization of my invention, I employ manually operable means for starting the stitching mechanism, and automatic means for stopping said mechanism, and manually operable means for throwing the cutting blade in communication with the power shaft, as well as effecting several movements to place the thread, and restore the parts.

So far as I am aware I am the first in the art to stitch a buttonhole, and throw the stitching mechanism out of operation, and manually operate specified means to position the stitches relative to a cutting blade. I regard this as vital inasmuch as it insures of the cutting blade forming the slit at the proper place between the stitches.

Another important feature of this invention is, that when the stitching mechanism is started, the feeders are stationary. This permits of several stitches being formed to hold the thread so that the future stitches can be accurately and perfectly formed. In this particular, I believe I am the first in the art to hold the threads by forming stitches, as in all machines known to me separate means are employed to hold the threads for the next stitching operation.

What I claim is:

1. In combination, stitch forming mechanism, a work support, means for creating relative movement between the stitch forming mechanism and the work support, a work clamp, means for causing the relative movement between the stitch forming mechanism and the work clamp to produce two rows of spaced apart stitches connected at their ends with barring stitches, the last of said stitches overlapping the first stitches, means for simultaneously returning the means which causes movement between the stitch forming mechanism and the work clamp to normal position for the next stitching operation and raising the work clamp, and means for forming a slit on a line between the two rows of stitches.

2. In a buttonhole machine, the combination with stitch forming mechanism, means for operating the stitch forming mechanism to produce two rows of spaced apart stitches connected at their ends by barring stitches, means for forming a series of lap stitches over a part of one of the rows of side stitches, and means for locating the threads of the stitches across the path of the cutting blade, and a cutting blade for severing the thread and the fabric between the two rows of stitches.

3. In a buttonhole machine, the combination with stitch forming mechanism, a cutting blade, means for operating the stitch forming mechanism and the cutting blade, and manually operable means for throwing the cutting blade into position with the operating means when the stitch forming mechanism is at rest, and means set by the starting of the stitch forming mechanism to permit of the operation of the manual means.

4. In a sewing machine, the combination with stitch forming mechanism, cutting mechanism, power mechanism, manually operated means for starting the stitch forming mechanism, a latch, said latch being set in position adjacent the cutting mechanism by operation of said manual means, manually operated means for operating the latch to start the cutting mechanism, said latch being thrown out of operative position by the operation of the cutting mechanism.

5. In a buttonhole machine, the combination with stitch forming mechanism, a cutting mechanism, power means, manually operated means for operating the power means to start the stitch forming mechanism, manually operated means including a latch for throwing the power means into communication with the cutting mechanism, when the latch is set, said latch being set by one of said manually operated means, and thrown out of operative position by the operation of the cutting mechanism.

6. In a buttonhole machine, the combination with stitch forming mechanism, cutting mechanism, power means, feeding means, means operating the feeding means and stopping it past its initial position, thread-positioning means, manually operated means for throwing the power means to start the stitching mechanism and the feeding means, automatic means for stopping said mechanism and the feeding means, a latch which is set by the manually operated means, manually operated means for moving the latch to start the cutting mechanism, move the thread placing means, and move the feeding means to its initial position, the latch being thrown out of operative position by the operation of the cutting mechanism.

7. In a buttonhole machine, the combination with stitch forming mechanism, cutting mechanism, power mechanism, means independently starting the stitching and cutting mechanisms, feeding mechanism which operates in conjunction with the stitch forming mechanism to feed the fabric in one direction, then in the reverse direction, and then a short distance in the direction of first movement, the feeding mechanism being restored to its initial position by the operation of the starting means for the cutting mechanism.

8. In a buttonhole machine, the combination with stitch forming mechanism, cutting mechanism, feeding mechanism, power mechanism, said power mechanism operating the feeding mechanism from an initial position and stopping it at a point distant from said initial position, and manually operated means for starting the cutting mechanism and restoring the feeding means to its initial position.

9. In combination, stitch forming mechanism, feeding mechanism, abutments, a cam having lateral movement between the abutments for moving the feeding mechanism in one direction, stopping it, reversing the movement and then stopping it, the stopping of the feeding mechanism being effected by the lateral movement of the cam between the abutments, and means for operating the stitching mechanism and the feeding mechanism.

10. In a buttonhole machine, the combination with stitch forming mechanism, cutting mechanism, feeding mechanism, a revolving drum cam for moving the feeding mechanism predetermined distances and stopping abutments, said drum cam having lateral movement between the abutments, the lateral movement serving to stop the feeding operation while the stitching mechanism places end stitches.

11. In a buttonhole machine, the combination with stitch forming mechanism, cutting mechanism, feeding mechanism, abutments, a cam for moving the feeding mechanism predetermined distances and stopping, said cam having lateral movement between abutments, the lateral movement serving to stop the feeding operation while the stitching mechanism places end stitches.

12. In a buttonhole machine, the combination with stitch forming mechanism, cutting mechanism, feeding mechanism, abutments, means for moving the feeding mechanism predetermined distances and stopping, said means having lateral movement between the abutments, the lateral movement serving to stop the feeding operation while the stitching mechanism places end stitches, means for operating the stitch forming mechanism to form lap stitches, and manually operated means for restoring the feeding mechanism to its initial position after the formation of the lap stitches.

13. In a buttonhole machine, the combination with stitch forming mechanism, cutting mechanism, a latch coöperating with the cutting mechanism when starting operation of the same, power mechanism, a clamp feeder, manually operated means for throwing the stitching mechanism and the clamp feeder into communication with the power mechanism and setting the latch in position to start the cutting mechanism, manually operated means for elevating the clamp-feeder and engaging the latch to operate the cutting mechanism, the latch being arranged to be manually thrown out of position to prevent operation of the cutting mechanism and without interfering with the elevating of the clamp feeder.

14. In a buttonhole machine, the combination with stitch forming mechanism, means having a feeder for feeding an article which is to receive a buttonhole, a connection including gears between the stitch forming mechanism and the feeding means, cutting mechanism, and means for separating the gears, moving and lifting the feeder in one operation.

15. In a buttonhole machine, the combination with stitch forming mechanism, means having a feeder for clamping and feeding an article which is to receive a buttonhole, a connection between the stitch forming mechanism and the clamping and feeding means, cutting mechanism, means for disconnecting the stitch forming mechanism and the feeding means, said means also moving and elevating the feeder, a cutting blade, and means for operating the cutting blade to cause it to pass through the fabric and sever the thread of the stitching mechanism.

16. In a buttonhole machine, the combination with stitch forming mechanism, means having a feeder for feeding an article which is to receive a buttonhole, a connection between the stitch forming mechanism and the feeding means, cutting mechanism, and means for disconnecting the stitch forming mechanism and the feeding means, moving and lifting the feeder in one operation.

17. In a buttonhole machine, the combination with stitch forming mechanism, means having a feeder for feeding an article which is to receive a buttonhole, means connecting the stitch forming mechanism and the feeding means, cutting mechanism, and means for manually disconnecting the stitch forming mechanism, and the feeding means, moving and lifting the feeder in one operation.

18. In a buttonhole machine, the combination with stitch forming mechanism, a feeder, a cutting blade, means for operating the cutter blade, means for locating the thread of the stitch forming mechanism across the path of the cutting blade, and means for operating the thread locating means and elevating the feeder in one operation.

19. In a buttonhole machine, the combination with stitch forming mechanism, a cutting blade, a feeder, means for locating the thread of the stitch forming mechanism across the path of the cutting blade, manually operated means for operating the thread locating means, starting the cutting blade to sever the thread and the fabric, and elevate the feeder in one operation.

20. In a buttonhole machine, the combination with stitch forming mechanism for producing buttonhole stitches and lap stitches over said buttonhole stitches, a feeder, means for operating the feeder to feed the fabric while being stitched, and stopping at a point past its initial position, a cutting blade, means for returning the fabric to its initial position to receive a slit, means for placing the thread of the stitching mechanism across the path of the cutting blade, to pass through the fabric and sever the thread, and means for operating the cutting blade.

21. In a buttonhole machine, the combination with stitch forming mechanism for producing buttonhole stitches and lap stitches over said buttonhole stitches, feeding means for feeding the fabric while being stitched, a cutting blade, manual means for positioning the fabric relative to the cutting blade after the stitches are formed to receive a slit, means for positioning the thread of the stitching mechanism across the path of the cutting blade, and means for operating the cutting blade to pass through the fabric and sever the thread.

22. In a sewing machine, the combination with a reciprocating and vibratory needle, means for reciprocating the needle, means for vibrating the needle, the latter means including a nest of grooved cams, means interposed between the nest of cams and the needle, means for bringing into operation a selected cam, and means for guiding the interposed means from one cam to the other.

23. In a sewing machine, the combination with a reciprocating and vibratory needle, means for reciprocating the needle, means for vibrating the needle, the latter means including a nest of grooved cams, and means interposed between the nest of cams and the needle to impart movement to the latter, said interposed means adapted to fit in the cam grooves, and automatic means for transferring the interposed means from one of said grooved cams to the other.

24. In a sewing machine, the combination with a reciprocating and vibratory needle, means for vibrating the needle, the latter means including a nest of grooved cams, and a yielding interposed means between the nest of cams and the needle to impart movement to the latter, and automatic means for shifting the yielding means from one of the cams to the other.

25. In a buttonhole machine, the combination with stitching mechanism including a reciprocating and vibratory needle, means for operating the needle, a cutting blade, feeding mechanism for feeding material the length of a buttonhole and back again, and then a portion of its length in the first direction, means for returning the feeding means to its normal position, means for placing the thread of the stitching mechanism across the path of the cutting blade, and means for operating the cutting blade to sever the thread and form a buttonhole.

26. In a sewing machine, the combination with a needle, means for vibrating the needle, including a nest of grooved cams with guides formed between them, means interposed between the nest of cams and the needle to impart motion to the latter, and mechanism for changing the position of the interposed means from one cam to the other.

27. In a sewing machine, the combination with a needle, means for vibrating the needle, including a nest of grooved cams, means interposed between the nest of cams and the needle to impart motion to the latter, said interposed means adapted to engage the grooved cams, and automatic means for creating a relative movement between one cam surface and another, and the interposed means.

28 In a buttonhole machine having a reciprocating needle, the combination with an automatically controlled needle vibrator, a stop and start motion device, cutting mechanism, means communicating motion thereto, a connection between the stop and start motion device and the cutting mechanism which is set to permit operation of the cutting mechanism by operation of the start motion device, and manually operated means for starting the cutting mechanism, the cutting mechanism when operated throwing the connection between it and the start motion device to its normal position.

29. In a buttonhole machine, the combination with stitch forming mechanism, cutting mechanism including a cutting blade, a rocking and laterally movable connection between the cutting blade and a power driven element, means on the element to operate the cutting blade, means for moving the connection laterally to engage the rocking means, and means to hold the connection in contact with the rocking means.

30. In a buttonhole machine, the combination with stitch forming mechanism, cutting mechanism including a reciprocating cutting blade, a power driven element, a connection between the cutting blade and the power driven element including a rock shaft, automatic means for creating relative movement between the rock shaft and power driven element to operate the cutting blade, and means to insure contact of the connection and the power driven element during operation of the cutting blade.

31. In a buttonhole machine, the combination with stitch forming mechanism and a cutting blade, power mechanism, and manually operated means for connecting the cutting blade with the power mechanism, said operating means being thrown out of operative position by each operation of the cutting blade, and reset by the succeeding starting of the stitching operation.

32. In a buttonhole machine, the combination with stitch forming mechanism and cutting mechanism, power mechanism, and pivoted manually operated means for connecting the cutting mechanism with the power mechanism, including a device operatively positioned with relation to the cutting mechanism by the starting of the stitching mechanism and returned to normal position at each operation of the cutting mechanism.

33. In a buttonhole machine, the combination with stitch forming mechanism, a power driven element provided with a cam groove and an ejector cam, cutting means including a shaft with an arm, a cutting blade, and means for engaging the arm with the cam groove to operate the blade, the ejector cam disengaging the arm from the cam groove.

34. In a buttonhole machine, the combination with stitch forming mechanism, a power driven element formed with a cam groove and an ejector cam, cutting means including a shaft with an arm, a spring, a track, and a cutting blade, the track holding the arm in the groove during the cutting operation, and the ejector cam and spring disengaging the arm from the cam groove.

35. In a buttonhole machine, the combination with stitch forming mechanism and cutting mechanism, power mechanism, and manually operated means for connecting the cutting mechanism with the power mechanism, including a pivoted latch mounted on a lever pivoted approximately at right angles to the pivot of the latch, said latch being operably positioned with relation to the cutting mechanism by the starting of the stitching mechanism.

36. In a buttonhole machine, the combination with stitch forming mechanism, means for feeding material under the stitch forming mechanism to receive buttonhole stitches and lap stitches, said feeding mechanism stopping past its initial position, means for operating the feeding means, manually operated means for returning the feeding means to normal position when the stitching operation is complete, said manual means moving the feed operating means in the same direction as when performing the stitching operation.

37. In a buttonhole machine, the combination with stitching mechanism, feeding mechanism having a feeder for feeding material to receive buttonhole stitches and lap stitches, manually operable means for returning the feeder to normal position and elevating said feeder when the stitching operation is complete.

38. In a buttonhole machine, the combination with stitch forming mechanism, feeding means including a feeder which is started from an initial point and stopped at a point distant from the initial starting point, means for operating the feeder, means for returning the feeder to the initial point after the stitching operation is complete, and means for severing the thread and forming a slit in the fabric in one operation.

39. In a buttonhole machine the combination with stitch forming mechanism, feeding means having a feeder which is started from an initial point and stopped at a point distant from the initial starting point, means for operating the feeder, and means for returning the feeder to its initial position and elevating said feeding means in one operation after the stitching operation is complete.

40. In a buttonhole machine, the combination with stitch forming mechanism, a cutting blade, feeding mechanism including a feeder, and means for causing a regular relative intermittent movement between the feeder and the stitch forming mechanism including a cam, and means coöperating with the cam for laterally moving said cam to cause a delay of the intermittent movement while end bar stitches are formed.

41. In a buttonhole machine, the combination with stitch forming mechanism, a cutting blade, power mechanism, and manually operated means for locating the thread of the stitching mechanism across the path of the cutting blade, and placing the cutting blade in communication with the power mechanism to cause the cutting blade in its operation to sever the thread and pass through the fabric.

42. In a buttonhole machine, the combination with stitch forming mechanism, a cutting blade, power mechanism, feeding mechanism, and manually operated means for locating the thread of the stitching mechanism across the path of the cutting blade, seting the feeding mechanism for the next operation, and placing the cutting blade in communication with the power mechanism.

43. In a buttonhole machine, the combination with needle and coöperating stitch forming mechanism, a cutting blade, manually operated means for placing the thread of the needle and coöperating stitch forming mechanism across the path of the cutting blade, and means for operating the cutting blade to pass through the fabric and sever the threads.

44. In a buttonhole machine, the combination with needle and coöperating stitch forming mechanism, a cutting blade, power mechanism, and manually operated means for locating the thread of the needle and coöperating stitch forming mechanism across the path of the cutting blade and placing the cutting blade in communication with the power mechanism, to cause said blade to pass through the fabric and sever the stitching threads.

45. In a buttonhole machine, the combination with stitch forming mechanism, including a reciprocating and vibratory needle, a nest of cams for vibrating the needle, automatic means for transmitting motion from anyone of said cams to the needle, manually controlled means for starting the stitch forming mechanism, a cutting blade, a feeder, manually controlled means for locating the thread of the stitch forming mechanism in the path of the cutting blade, throwing the cutting blade into communication with the power mechanism, and resetting the feeder for the next stitching operation.

46. In a buttonhole machine, the combination with a reciprocating and vibratory needle, means for vibrating the needle including a shaft and a cam, feeding mechanism including a feeder and a cam for moving the feeder to an abnormal position, a continually revolved power shaft, means between the power shaft and the vibrating means and the feeder cam for imparting intermittent movement to said feeder cam and manual means for separating the feeding mechanism from the power shaft, and returning said feeder to normal position after each operation of the stitching mechanism.

47. In a buttonhole machine, the combination with a stitch forming mechanism including a reciprocating and vibratory needle, means for vibrating the needle, including a shaft and a cam, a cutting blade, power mechanism, feeding mechanism, including a feeder and a cam for moving the feeder, a continually revolved power shaft, means between the power shaft and the vibrating means and the feeder cam for imparting intermittent movement to said feeder cam, manual means for locating the thread of the stitch forming mechanism across the path of the cutting blade, setting the feeder in normal position after each operation of the stitching mechanism, and placing the cutting blade in communication with the power mechanism.

48. In a buttonhole machine, the combination with a reciprocating and vibratory needle, means for vibrating the needle, feeding mechanism including a feeder which stops beyond its initial starting point, a cam, a shaft for the cam, said cam having lateral motion on the shaft, a continually revolved power shaft, means between the latter and the cam shaft to impart intermittent motion thereto, the lateral motion of the cam causing the feeding operation to cease for determinate periods, and manual means for setting the feeder after each operation of the stitching mechanism.

49. In a buttonhole machine, the combination with stitch forming mechanism, a cutting blade, means for operating the same, means for locating the thread of the stitch forming mechanism across the path of the cutting blade, feeding mechanism, means for intermittently moving the feeding mechanism, and means for disconnecting said latter mechanism from the feeding mechanism including a cam and a pin, and a manually controlled device to operate the cam and pin, and the thread locating means.

50. In a buttonhole machine, the combination with stitch forming mechanism, a cutting blade, a feeder, an intermittently revolved cam to operate the feeder, means for operating the cam, means for locating the thread of the stitch forming mechanism across the path of the cutting blade, a sliding bar operating the latter means, a cam interposed between said bar and the feeder cam to disconnect the feeder cam from its operating means, means to return the bar and the cam operating means to normal position, and means to operate the bar.

51. In a buttonhole machine, the combination with stitch forming mechanism, a cutting blade, a feeder, an intermittently revolved cam to operate the feeder, means for operating the cam, means for locating the thread of the stitch forming mechanism across the path of the cutting blade, a sliding bar operating the latter means, a cam interposed between said bar and the feeder cam to disconnect the feeder cam from its operating means, means to return the bar and the cam operating means to normal position, and manual means to operate the bar.

52. In a buttonhole machine, the combination with stitch forming mechanism, a cutting blade, a feeder which is set after each operation of the stitch forming mechanism, an intermittently revolved cam for operating the feeder, means for operating the cam, means for locating the thread of the stitch forming mechanism across the path of the cutting blade, a sliding bar operating the latter means, a cam interposed between the bar and the feeder cam to disconnect the feeder cam from its operating means, and manual means for setting the feeder cam and operating the bar.

53. In a buttonhole machine, the combination with needle and coöperating stitch forming mechanism, a cutting blade, means for locating the thread of the coöperating stitch forming mechanism across the path of the cutting blade, means for locating the thread of the needle across the path of the cutting blade, means to operate the thread locators, and means for operating the cutting blade, said blade severing the upper and lower threads and in operation passing through the fabric.

54. In a buttonhole machine, the combination with needle and coöperating stitch forming mechanism, a cutting blade, means for locating the thread of the coöperating stitch forming mechanism across the path of the cutting blade, means for locating the thread of the needle across the path of the cutting blade, manual means having an operated lever located under the needle and coöperating stitch forming mechanism to operate the thread locators, and means for operating the cutting blade, said blade severing the needle and coöperating threads and in operation passing through the fabric.

55. In a buttonhole machine, the combination with stitch forming mechanism, a cutting blade, power means, means for automatically stopping the stitch forming mechanism, manual means for locating the thread of the stitch forming mechanism across the path of the cutting blade, positioning the stitched article under the cutting blade, throwing the cutting blade into connection with the power means, and raising the feeder to remove an article in one operation.

56. In a buttonhole machine, the combination with stitch forming mechanism, a cutting blade, power means, means for automatically stopping the stitch forming mechanism, manual means for locating the thread of the stitch forming mechanism across the path of the cutting blade, positioning the stitched article under the cutting blade, throwing the cutting blade into connection with the power means, raising the feeder to remove an article in one operation, and automatic means to return the same to normal position.

57. In a buttonhole machine, the combination with stitch forming mechanism, a cutting blade, means for locating the thread of the stitch forming mechanism across the path of the cutting blade, a stop and start motion mechanism, a tension device, means between the stop and start motion mechanism and the tension device to operate said tension device to hold the thread taut during stitching operation and release said thread when said operation ceases, and manual means for moving the thread locator and starting the cutting blade.

58. In a buttonhole machine, the combination with a reciprocating and vibratory needle, a nest of cams for vibrating the needle, means interposed between the nest of cams and the needle to impart vibratory motion to the latter, and means for preventing disengagement of said means with a selected cam while the needle is in engagement with the fabric.

59. In a buttonhole machine, the combination with a reciprocating and vibratory needle, a nest of cams for vibrating the needle, means interposed between the cams and the needle to vibrate the latter, automatic means for changing the relative position of said means and a selected cam of the nest, and means for preventing the disengagement of the interposed means and an operative cam surface while the needle is in the fabric being stitched.

60. In a buttonhole machine, the combination with stitch forming mechanism including a reciprocating and vibratory needle, a nest of two cams for forming two different widths of stitches and two rows of spaced apart stitches, means interposed between the nest of cams and the needle to impart movement thereto, the end of said means being held in engagement with the nest of cams, and automatic means for changing the position of the interposed means relative to the nest of cams.

61. In a buttonhole machine, the combination with a reciprocating and vibratory needle, a nest of cams for vibrating the needle and forming two different widths of stitches, a cutting blade, feeding mechanism for feeding the fabric past an initial position, and means for returning the feeding mechanism to normal position, and operating the cutting blade to form a slit in the fabric and sever the thread of the needle.

62. A sewing machine, including stitch forming mechanism, feeding mechanism including a feeder and a cam, and means coöperating with the cam for laterally moving said cam to cause lost motion to hold the feeder for a determinate period after the stitching mechanism is started.

63. A sewing machine, including stitch forming mechanism, feeding mechanism including a cam for creating relative movement between the stitch forming mechanism and the feeding mechanism, and means coöperating with the cam for laterally moving said cam to cause lost motion, the lost motion causing the relative movement to cease for a determinate period after the stitching mechanism is started.

64. In combination, stitch forming mechanism, feeding mechanism including a feeder and a revolving cam, said cam imparting to the feeder movement in a straight line in one direction, stopping it, moving the said feeder in reverse direction in a straight line in its previous path of movement and stopping it, means coöperating with the cam for causing said cam to be laterally moved while revolving to effect the stopping of the feeder, and a constantly rotating power shaft which imparts revolving movement to the cam.

65. In a buttonhole machine, the combination with stitch forming mechanism, cutting mechanism, power mechanism, means for independently starting the stitching mechanism, means for starting the cutting mechanism, feeding mechanism which operates in conjunction with the stitch forming mechanism to feed the fabric, means for causing the movement of the feeding mechanism to be arrested past its initial starting point, said feeding mechanism being restored to its initial position by the operation of the starting means for the cutting mechanism.

66. In a buttonhole machine, the combination with stitch forming mechanism, cutting mechanism, power means, feeding means, means operating the feeding means and stopping it past its initial position, thread positioning means, manually operated means for throwing the power means to start the stitching mechanism and the feeding means, automatic means for stopping said mechanism and the feeding means, a latch which is set in operative position by the manually operated means, means for moving the latch to start the cutting mechanism, move the thread placing means, and move the feeding means to its initial position.

67. In a buttonhole machine, the combination with stitch forming mechanism, a cutting blade, a feeder, mechanism for operating the feeder including gears, the movement of said feeder terminating at a point distant from its starting point, and means for separating the gears, returning the feeder to normal position and starting the operation of the cutting blade in one operation.

68. In a buttonhole machine, the combination of stitching mechanism, a cutting blade, a feeder, mechanism for operating the feeder including a worm and worm gear, the threads of which are partially spiral and partially concentric, other gears between the worm gear and the feeder, and means for stopping the movement of feeder at a point distant from its starting point, and means for separating the latter gears, moving the feeder to normal position and starting the cutting blade.

69. In a buttonhole machine, the combination of stitch forming mechanism, a cutting blade, mechanism for operating the stitch forming mechanism and the cutting blade, a feeder, a drum cam for imparting movement to the feeder, a shaft, gears for imparting movement to the drum cam, a worm gear having threads partially concentric and partially spiral, a gear on the shaft with which the worm gear meshes, means for operating the worm gear from the mechanism which operates the stitch forming mechanism and the cutting blade, and means for separating the gears which impart movement to the drum cam.

70. In combination, sewing mechanism, a feeder, a grooved cam, and gears for intermittently moving the feeder, means for stopping the movement of the feeder at a point distant from its starting point, and independent means for elevating the feeder and returning said feeder to its starting point.

71. In a buttonhole sewing machine, the combination of stitch forming mechanism, a feeder formed with an extension, a slide on which the feeder is pivoted, a seat formed in the feeder, a pin supported in the seat and extending through an opening in the extension, a spring interposed between the extension and the feeder, means for operating on the extension to compress the spring and elevate the feeder, and mechanism for intermittently moving the slide.

72. In a buttonhole machine, the combination with stitch forming mechanism, cutting mechanism, starting mechanism, a tension device, a connection between the starting mechanism and the tension device whereby the tension on the thread of the stitch forming mechanism is released when the starting mechanism assumes normal position after the stitching operation is completed, and means for drawing the thread for the next stitching operation after the tension device has been released.

73. In a buttonhole machine, the combination with a stitch forming mechanism, cutting mechanism, starting mechanism, a tension device, a connection between the starting mechanism and the tension device whereby the tension on the thread of the stitch forming mechanism is released when the starting mechanism assumes normal position after the stitching operation is completed, and manual means for drawing the thread for the next stitching operation after the tension device has been released.

74. In combination, stitch forming mechanism, feeding mechanism, a cam having lost motion, said cam imparting movement to the feeding mechanism in one direction and stopping it, the stopping of the feeding mechanism being affected by the lost motion, means including gears for operating the stitch forming mechanism and the cam, a slide carrying a cam, means for operating the slide to cause the cam on the slide to separate the gears for movement of the feeding mechanism independent of the stitching mechanism, and means for moving the feeding mechanism independently of the stitching mechanism.

75. In a buttonhole machine, the combination of stitch forming mechanism, a cutting blade, mechanism for operating the stitch forming mechanism and the cutting blade, a feeder, a drum cam for imparting movement to the feeder, a shaft, gears between the drum cam and the shaft, a worm gear having threads which are partially concentric and partially spiral, a gear on the shaft with which the worm gear meshes, means for operating the worm gear from the mechanism which operates the stitch forming mechanism and the cutting blade, and manual means for separating the gears between the drum cam and the shaft.

76. In combination, sewing mechanism, a feeder, a grooved cam and gears revolving in one direction for intermittently moving the feeder, means for stopping the movement of the feeder at a point distant from its starting point, and independently manually controlled means for separating the gears and causing the cam to be revolved in the same direction as when operating the feeder during the stitching operation to return said feeder to its starting point, independent of the sewing mechanism.

77. In a buttonhole machine, the combination with a reciprocating and vibratory needle, a nest of cams for vibrating the needle, means for locating the stitching thread across the path of the cutting blade, a cutting blade for severing the stitching thread and passing in operation through the fabric, means for starting operation of the cutter, a feeder, a cam for operating the feeder intermittently, means coöperating with the cam to impart regular intermittent movement to said cam, means for causing the regular intermittent movement of the feeder to cease for determinate periods, said cam stopping the feeder at a point distant from its starting point, means for returning the feeder to normal position, said latter means being operated by the means which starts the operation of the cutter.

78. In a buttonhole machine, the combination with a vibratory needle bar, a nest of cams for vibrating the needle bar, means between the cams and the needle bar for transferring the motion from the cams, a cutting blade, starting mechanism, a tension device, a connection between the starting mechanism and the tension device whereby the tension on the stitching thread is released when the starting mechanism assumes normal position after the stitching operation is completed, means for drawing the thread from the tension device after it is released, and placing said thread in the path of the cutting blade, the blade in operation severing the thread and passing through the fabric.

79. In a buttonhole machine, the combination with stitch forming mechanism including a needle bar, a nest of cams for vibrating the stitch forming mechanism, means between the cams and the needle bar for transferring the motion from the cams, a cutting blade, starting mechanism, a tension device, a connection between the starting mechanism and the tension device whereby the tension on the thread of the stitch forming mechanism is released when the starting mechanism assumes normal position after the stitching operation is completed, manually controlled means for drawing the thread from the tension device after it is released and placing said thread in the path of the cutting blade, and means operating the cutting blade to sever the thread and the fabric.

80. A buttonhole sewing machine comprising stitch forming mechanism, including a reciprocating and vibratory needle bar and needle operable in a frame, a nest of cam surfaces, means for operating the cam surfaces, an element coöperating with the cam surfaces, a rod interposed between cup shaped depressions formed in the element and the frame, and means for retaining the rod in the depressions.

81. A buttonhole sewing machine, comprising stitch forming mechanism, including a reciprocating and vibratory needle bar and needle operable in a frame having a depression, a nest of cam surfaces, a member formed with a depression and coöperating with a selected cam surface, means for shifting said member from one of said cam surfaces to another, a rod having its ends supported in the depressions, and a spring for holding the rod in the depressions.

82. A buttonhole machine, including stitching mechanism, a cutting blade, feeding mechanism including a feeder, means including a cam for intermittently moving the feeder in two directions in a straight line in a given determinate path, means coöperating with the cam for laterally moving the latter to cause lost motion between the feeder and cam for causing a determinate pause in the two extreme movements of the feeder while the stitching mechanism forms end barring stitches.

83. A sewing machine, including stitching mechanism, having a reciprocating and vibratory needle, a nest of cams, located adjacent each other for vibrating the needle guides between the cams, means intermediate the nest of cams and the needle to impart motion to the latter, said means engaging a selected cam and in operation being directed by the guides from one cam to the other, and means for taking up wear of the intermediate means.

84. A buttonhole sewing machine, comprising stitch forming mechanism, including a vertically reciprocating and vibratory needle, cams for vibrating the needle, means for operating the cams, mechanism for feeding and clamping the material, means for operating the clamping mechanism to feed the material intermittently to the needle, said means comprising in its organization a cam and constantly revolving meshing gears, said gears having their meshing faces formed to impart motion to the cam during a part of their revolution only to intermittently move the feeding mechanism, and means for operating the gears.

85. A buttonhole sewing machine, comprising stitch forming mechanism, including a reciprocating and vibratory needle bar and needle, a nest of cam surfaces for vibrating the needle, and coöperating mechanism adapted to be placed in the path of each of the cams in the nest to vibrate the needle, and means for automatically operating the coöperating means.

86. A buttonhole sewing machine comprising stitch forming mechanism including a vertically reciprocating and vibratory needle bar and needle, a nest of cams in each of which is a groove, the grooves of the adjacent cams communicating with each other at a determinate point, means intermediate the nest of cams and the needle bar to vibrate the latter, said latter means being always in engagement with one cam in the nest, mechanism for shifting the intermediate means from one cam groove to another at the point where said grooves communicate, and means for revolving the nest of cams.

87. A buttonhole sewing machine comprising stitch forming mechanism including a reciprocating and vibratory needle bar and needle, a nest of cams formed with grooves, the grooves of adjacent cams communicating, the nest of cams including needle vibrating cams and switching cams, a connection between the nest of cams and the needle bar, and automatic means for shifting the connection to a switching cam and thence to a needle vibrating cam.

88. A buttonhole sewing machine comprising stitch forming mechanism including a vertically reciprocating and vibratory needle bar and needle, a series of needle vibrating cam surfaces spaced from each other, switching cams interposed between the needle vibrating cams, a connection between the cams and the needle bar, means for revolving the needle vibrating cams and the switching cams simultaneously, and automatic means for placing the connection in the path of a switching cam, the latter transferring the connection to a needle operating cam.

89. A buttonhole machine comprising stitch forming mechanism including a reciprocating and vibratory needle bar and needle, mechanism for vibrating the needle bar including a nest of grooved cams, a follower adapted to fit in the grooves, a rod between the follower and the needle bar, and automatic means for transferring the follower from one grooved cam to another.

90. A sewing machine including a reciprocating vibratory needle bar and needle, a frame in which the needle bar is mounted, a nest of cams, means loosely fitted intermediate the nest of cams and the frame and disconnected therefrom at its ends to transmit motion to the frame, a tension device for retaining the intermediate means in position and taking up wear between said means and the frame.

91. In a buttonhole machine, the combination with the stitch forming mechanism, a work clamp, means for producing relative movement between the stitch forming mechanism and work clamp for forming buttonholes, a cutting blade, and means operating the cutting blade for forming the buttonhole and severing the thread of the stitching mechanism.

92. In combination, mechanism for forming spaced rows of side and barring stitches and cutting means passing between said rows of stitches and severing the thread.

93. In combination, stitch forming mechanism, a cutting blade, starting mechanism, mechanism operating the stitch forming mechanism, mechanism for operating the cutting blade, including a latch, said latch capable of being manually thrown out of operative position during the stitching operation to prevent operation of the cutting blade, and means between the latch and starting mechanism for restoring the latch to normal position when the stitch forming mechanism is started.

94. In combination, stitch forming mechanism, a cutting blade, mechanism operating the stitch forming mechanism, mechanism for operating the cutting blade including a latch, feeding mechanism, means operating the feeding mechanism, means stopping the movement of the feeding mechanism at a point distant from its initial position, and means returning the feeding mechanism to initial position and operating the latch to throw into operation the cutting blade, and means supporting the latch whereby it may be manually thrown out of position to prevent operation of the cutting blade during operation of the stitching mechanism.

95. In combination, a reciprocating and vibratory needle, a nest of cams for vibrating the needle, a follower operating adjacent the cams, a series of switch cams for switching the follower from one cam to the other, and mechanism operating the follower to position it adjacent a switch while the needle is in the material being operated upon.

96. In a buttonhole machine, the combination with stitch forming mechanism, a work clamp, means for producing relative movement between the stitch forming mechanism and the work clamp comprising a nest of working and switch cams, a follower coöperating with the nest of cams, and mechanism for operating the follower to position it adjacent a switch cam while the needle is in the material being operated upon.

97. In combination, means for forming a row of stitching in a fabric, and cutting means operating along side the row of stitching and passing in operation from a position on one side of the fabric to a position on the other side thereof, said means severing the stitching thread beyond the row of stitching only.

98. In a buttonhole machine, the combination with stitch forming mechanism, a work clamp, means for producing a relative movement between the work clamp and the stitch forming mechanism to form spaced rows of stitching, and cutting means passing between said rows of stitches and severing the thread.

99. In combination, buttonhole mechanism for stitching buttonholes, cutting means for severing the thread and passing through the fabric to complete the buttonhole, means locating the thread of the buttonhole mechanism in the path of the cutting means, and means for operating the cutting means.

100. In a buttonhole machine, the combination of stitching mechanism, a cutting blade, and means operating the cutting blade to form an opening in the material being operated upon and sever the thread of the stitching mechanism.

101. In a buttonhole machine, the combination with stitch forming mechanism, a work clamp, means for producing relative movement between the work clamp and stitch forming mechanism, a cutting device for severing the thread of the stitch forming mechanism across the line where a buttonhole occurs, and means for operating the cutting device, said device passing through the stitched material where a buttonhole occurs.

102. In a buttonhole machine, upper and lower stitch forming mechanism, a work clamp, means for producing relative movement between the work clamp and stitch forming mechanisms, for forming buttonhole stitches, a cutting blade, means for locating the threads of the upper and under stitching mechanisms across the path of the cutting blade, and means reciprocating the cutting blade to sever the threads in its path and the fabric in one operation.

103. In a buttonhole machine, the combination with stitch forming mechanism, a work clamp, means for producing relative movement between the stitch forming mechanism and the work clamp for forming two rows of stitches, a cutting blade, thread carrying means to position the thread of the stitching mechanism in the path of the cutting blade, the said latter means also serving to draw the thread to make it slack after it is severed, mechanism for moving the thread carrying means, and means operating the cutter to sever the positioned thread of the stitching mechanism on a line between the two rows of stitches, said cutting blade passing through the fabric operated upon.

104. In a buttonhole machine, the combination with stitch forming mechanism, a work clamp, means for producing relative movement between the stitch forming mechanism and work clamp, for forming two rows of spaced apart stitches, mechanism for locating the thread of the stitching mechanism across the space between the two rows of stitches, and means for severing the thread on a line between the two rows of stitches, said means passing through the fabric operated upon.

105. In a buttonhole machine, the combination with stitch forming mechanism, a work clamp, means for producing relative movement between the stitch forming mechanism and work clamp for stitching buttonholes, cutting means for severing the thread of the stitch forming mechanism, means locating the thread of the stitch forming mechanism in the path of the cutting mechanism, the work clamp for holding the article in which a buttonhole is being worked, and means for operating the cutting means before the work clamp is released from the article.

106. In a buttonhole machine, the combination with the stitch forming mechanism, a work clamp, means for producing relative movement between the stitch forming mechanism and work clamp for forming buttonholes, a cutting blade, and means operating the cutting blade for forming the buttonhole and severing the thread of the stitch forming mechanism.

107. In a buttonhole machine, the combination with stitch forming mechanism, a work clamp, means for producing relative movement between the stitch forming mechanism and the work clamp for forming buttonhole stitches, and means for cutting the buttonhole in the fabric and the thread of the stitch forming mechanism in one operation.

108. In a buttonhole machine, the combination with needle and coöperating stitch forming mechanism, a work clamp, means for producing relative movement between the needle and coöperating stitch forming mechanism and the work clamp for forming buttonhole stitches, and a blade for severing the threads of the needle and coöperating stitch forming mechanism adjacent the completed stitches in one operation and before the work clamp is moved from the article being operated upon, said blade in operation passing through the article.

109. In a buttonhole machine, the combination with needle and coöperating stitch forming mechanism, a work clamp, means for producing relative movement between the needle and coöperating stitch forming mechanism and the work clamp, and a blade for severing the threads of the needle and coöperating stitch forming mechanism on opposite sides of the article and adjacent the completed stitches before the article is released by the work clamp, said blade in operation passing through the article.

110. In a buttonhole machine, the combination with stitch forming mechanism, a work clamp, means for producing relative movement between the stitch forming mechanism and work clamp for forming buttonhole stitches, a cutting blade, means for locating the thread of the stitching mechanism across the path of the cutting blade, and mechanism operating the cutting blade to sever the fabric and the thread located across the path of the cutting blade.

111. In a buttonhole machine, the combination with needle and coöperating stitch forming mechanism, a work clamp, means producing relative movement between the stitch forming mechanism and work clamp, a cutting blade, means positioning the needle and coöperating threads of the stitch forming mechanism across the path of the cutting blade, and means operating the cutting blade to sever the needle thread and pass through the material and sever the coöperating thread.

112. In combination, a buttonhole stitching machine having stitch forming mechanism, a cutting blade, means for locating the thread of the stitching mechanism across the buttonhole stitches in the path of the cutting blade, and mechanism operating the cutting blade to sever the thread across the stitches and pass through the fabric between the buttonhole stitches in the operation.

113. In combination, a buttonhole machine having stitch forming mechanism and a cutting blade for severing the fabric to stitch and cut a buttonhole, mechanism for locating the thread across the path of the cutting blade, and over the stitches of a completed buttonhole and mechanism for operating the cutting blade to sever the said thread and pass through the fabric between the buttonhole stitches in the operation.

114. In a buttonhole machine, the combination with stitch forming mechanism, a work clamp, mechanism for producing relative movement between the stitch forming mechanism and work clamp, mechanism for locating the thread across the buttonhole stitches, and means for automatically severing the located thread between the buttonhole stitches, also the fabric between the stitches.

115. In a buttonhole machine, the combination with stitch forming mechanism and a work clamp, a cutting blade, means for producing relative movement between the stitch forming mechanism and work clamp to form buttonhole stitches, means for locating the thread of the stitch forming mechanism across the path of the cutting blade and drawing said thread for the next stitching operation, and means for operating the cutting blade, said cutting blade severing the thread located in its path and the fabric.

116. In combination, stitching mechanism for forming buttonhole stitches, mechanism locating the thread of the stitching mechanism across the buttonhole stitches and simultaneously drawing sufficient of said thread to form slack for the next operation, and means for automatically severing said thread between the buttonhole stitches, and also the fabric.

117. In combination, buttonhole stitching mechanism comprising needle and coöperating stitching mechanism, a cutting blade, means positioning the threads of the needle and coöperating stitch forming mechanism across the path of the cutting blade, and means also serving to draw the threads slack for future operations, and mechanism for operating the cutting blade to sever the threads of needle and coöperating stitch forming mechanism and cut the fabric between the buttonhole stitches.

118. In a buttonhole machine, the combination with needle and coöperating stitch forming mechanism for forming two rows of spaced apart stitches, means positioning the needle and coöperating threads of the stitch forming mechanism across the space between the rows of buttonhole stitches, said means also serving to draw the threads slack for future operation, and means passing through the fabric for severing the threads of the needle and coöperating stitching mechanism on a line between two rows of buttonhole stitches.

119. In combination, a buttonhole machine comprising needle and coöperating stitch forming mechanism, a cutting blade, a pair of arms for locating the threads of the needle and coöperating stitch forming mechanism across the path of the cutting blade, mechanism for operating the arms, and mechanism operating the cutting blade to sever the located threads and the fabric.

120. In a buttonhole machine, the combination with needle and coöperating stitch forming mechanism, a work clamp, means producing relative movement between the needle and coöperating stitch forming mechanism for forming two rows of spaced apart stitches, a cutting blade, a pair of pivoted arms for locating the threads of the needle and coöperating stitching mechanism across the path of the cutting blade and the space between the stitches, said arms also serving to draw the threads slack for the next operation, and means operating the cutting blade to cause it to pass through the fabric and sever the located threads between the two rows of buttonhole stitches.

121. In a buttonhole machine, the combination with needle and coöperating stitch forming mechanism, a work clamp, means for producing relative movement between the stitch forming mechanism and the work clamp to form two rows of spaced apart stitches, cutting means, means positioning the needle and coöperating threads of the stitch forming mechanism across the path of the cutting means, and means operating the cutting means to sever the threads of the needle and coöperating stitch forming mechanism between the two rows of stitches and to sever the fabric.

122. In a sewing machine, the combination with stitch forming mechanism, a work clamp, means for producing relative movement between the stitch forming mechanism and work clamp for forming stitches in a fabric, means for severing the stitching thread at a predetermined locality and to simultaneously pass through a limited area only of the fabric.

123. In a buttonhole machine, the combination with stitch forming mechanism, a work clamp, means for producing a relative movement between the stitch forming mechanism and work clamp, including a nest of revolving working and switch cams and a follower coöperating therewith, and means operating the follower to position it opposite a switch cam, the latter switching the follower to a working cam.

124. In a buttonhole machine, the combination with stitch forming mechanism, a work clamp, means for producing a relative movement between the work clamp and the stitch forming mechanism, including a nest of revolving working cams and revolving switch cams and a follower coöperating with the nest of cams, each of said cams being grooved, means between the switch cams and working cams to allow of said follower being switched by a switch cam to a working cam, and means for operating the follower.

125. In a sewing machine, the combination with stitch forming mechanism, a work clamp having ears with conical seats, a slide carrying the work clamp, threaded lugs extending from the work slide and registering with the perforated ears, pointed screws engaging the threaded openings, the points of the screws engaging the conical seats in the ears, and means for locking the screws.

126. In a buttonhole machine, the combination with stitch forming mechanism including a reciprocating and vibratory needle, a nest of three cams for forming two different widths of stitches and two rows of spaced apart side stitches, means interposed between the nest of cams and the needle to impart movement to the latter, means to shift the interposed means from one cam to the other and means for operating the cams.

127. In a buttonhole machine, the combination with stitch forming mechanism including a reciprocating and vibratory needle, a nest of three cams for forming two different widths of stitches, and two rows of spaced apart side stitches, means interposed between the nest of cams and the needle to impart movement to the latter, means to shift the interposed means from one cam to the other, means for operating the cams, a feeder, and means for moving the feeder in a straight line under the needle the length of a buttonhole and back again.

128. In a buttonhole machine, the combination with stitch forming mechanism including a reciprocating and vibratory needle, a nest of three cams for forming two different widths of stitches, and two rows of spaced apart stitches, means interposed between the nest of cams and the needle to impart movement to the latter, means for operating the cams, means for moving the feeder in a straight line under the needle the length of a buttonhole and back again to the initial starting point and then moved again a short distance in direction of the first movement.

129. In a buttonhole machine, the combination with a reciprocating and vibratory needle, a nest of cams for vibrating the needle, means interposed between the same and the needle to vibrate the latter, automatic means for changing the relative position of said means and a selected cam of the nest including switching cams the switching operation being performed when the automatic means is being set to position the needle or return it to normal position, while said needle is in the fabric.

130. In a buttonhole machine, the combination with stitch forming mechanism including a needle, means for vibrating the needle laterally including cams and a connection between said cams and the needle, said connection comprising cups, and a rod interposed between the cups, a spring for holding the rod in the cups, means for adjusting one of the cups to bring the needle into coöperation with a cutting blade, a cutting blade, and means for operating the stitch forming mechanism and the cutting blade.

131. In a buttonhole machine, the combination with stitch forming mechanism, a feeder, a slide carrying the feeder, a track on which the slide travels, anti-friction devices intermediate the track and slide, means connected with the slide for moving it, and a gear having its threads partially concentric and partially eccentric for moving the slide moving means.

132. In a buttonhole machine, the combination with stitch forming mechanism, a feeder means for intermittently moving the feeder and stopping it including a cam having a proud portion the cam moving the feeder backward and forward, the proud portion carrying the feeder past its initial starting point, automatic means for stopping the stitching mechanism and the cam when the feeder reaches the proud portion of said cam, and manual means for returning the feeder to starting position.

133. In a buttonhole machine, the combination with stitch forming mechanism, a work clamp, means producing relative movement between the work clamp and the stitch forming mechanism for forming two rows of spaced apart zigzag side stitches and end barring stitches, said means including two cams for forming the said two rows of side stitches and one cam for forming the said end barring stitches.

134. In combination, stitch forming mechanism for forming side and end bar stitches and tying stitches over a part of the side stitches, a cutting blade, feeding mechanism including a feeder having a projection, a drum cam having an endless peripherical cam groove formed with a dwell, said projection fitting in the groove and causing the feeder to move back and forth in a determinate path, the dwell causing the feeder to remain stationary while the stitching mechanism forms a part of the end barring stitches, the said cam also moving the feeder to form the tying stitches over a part of the side stitches.

In testimony whereof I affix my signature, in presence of two subscribing witnesses.

HENRY C. MILLER.

Witnesses:
 JNO. IMIRIE,
 W. A. WILLIAMS.

---

Copies of this patent may be obtained for five cents each, by addressing the "Commissioner of Patents, Washington, D. C."